United States Patent
Shahbazian et al.

(10) Patent No.: US 12,511,118 B1
(45) Date of Patent: Dec. 30, 2025

(54) SYSTEM AND METHOD FOR TRANSMISSION OF SOFTWARE TO REMOTE ENVIRONMENTS

(71) Applicant: Parry Labs, LLC, Alexandria, VA (US)

(72) Inventors: Andy Shahbazian, Los Angeles, CA (US); David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/889,837

(22) Filed: Sep. 19, 2024

(51) Int. Cl.
*G06F 8/65* (2018.01)

(52) U.S. Cl.
CPC ..................... *G06F 8/65* (2013.01)

(58) Field of Classification Search
USPC ............. 717/172, 168–74; 706/24–45
See application file for complete search history.

(56) References Cited

U.S. PATENT DOCUMENTS

| | | | |
|---|---|---|---|
| 7,941,658 B2 * | 5/2011 | Karpa | G06F 11/1433 713/1 |
| 10,203,947 B2 * | 2/2019 | Shiraishi | G06F 8/65 |
| 10,664,574 B1 * | 5/2020 | Powers | G06F 21/6218 |
| 10,684,844 B2 * | 6/2020 | Compton | G06F 8/65 |
| 11,159,656 B2 | 10/2021 | Michon et al. | |
| 11,237,813 B1 * | 2/2022 | Chen | G06F 8/63 |
| 2009/0138870 A1 * | 5/2009 | Shahindoust | H04L 67/34 717/172 |
| 2012/0054730 A1 * | 3/2012 | Michishita | G06F 8/658 717/169 |
| 2017/0090903 A1 * | 3/2017 | Bainville | G06F 8/71 |
| 2021/0334085 A1 | 10/2021 | Vessels et al. | |
| 2022/0327867 A1 | 10/2022 | Thirion et al. | |
| 2023/0017403 A1 * | 1/2023 | Vladimerou | H04W 24/02 |

(Continued)

FOREIGN PATENT DOCUMENTS

EP 3462306 A1 4/2019

OTHER PUBLICATIONS

Sharma et al.; "A Machine Learning-Based Protocol for Efficient Routing in Opportunistic Networks"; IEEE Systems Journal, vol. 12, No. 3, pp. 2207-2213; Sep. 2018 (Year: 2018).*

(Continued)

*Primary Examiner* — Anil Khatri
(74) *Attorney, Agent, or Firm* — Caldwell Intellectual Property Law

(57) ABSTRACT

A system for transmission of software to remote environments, the system including at least a processor and a memory communicatively connected to the at least a processor, the memory containing instructions configuring the at least a processor to receive update data for use in one or more operating environments, identify at least one operating environment for receipt of the update data, divide the update data into a plurality of data bundles, transmit the plurality of data bundles to the at least one operating environment, wherein transmitting the plurality of data bundles includes identifying a plurality of participating nodes for transmission of the plurality of data bundles and transmitting each data bundle of the plurality of data bundles with each participating node of the plurality of participating nodes and record the transmission on a central log.

14 Claims, 9 Drawing Sheets

(56) References Cited

U.S. PATENT DOCUMENTS

| | | | |
|---|---|---|---|
| 2023/0418585 A1* | 12/2023 | Wang | G06F 8/65 |
| 2024/0250917 A1* | 7/2024 | Milano | H04L 47/783 |
| 2024/0289106 A1* | 8/2024 | Sethi | G06F 8/65 |
| 2024/0296042 A1* | 9/2024 | Nistor | G06F 8/654 |
| 2024/0303064 A1* | 9/2024 | Sato | G06F 8/65 |

OTHER PUBLICATIONS

"Design Assurance Level (DAL) and Software Level in DO-178C: A Deep Dive with Examples"; TheCloudStrap.com website [full URL included in ref.] as captured by the Wayback Machine Internet Archive (web.archive.org)on Jul. 10, 2024 (Year: 2024).*

Jones, et al.; "Practical Routing in Delay-Tolerant Networks"; Proceedings of the 2005 ACM SIGCOMM workshop on Delay-tolerant Networking; 2005 (Year: 2005).*

Wang et al, "SSDS: A Smart Software-Defined Security Mechanism for Vehicle-to-Grid Using Transfer Learning", IEEE, pp. 1-9 (Year: 2018).*

Basha et al, "A Review on Secure Data Transmission and Classification of IoT Data Using Blockchain-Assisted Deep Learning Models", IEEE, pp. 1-4 (Year: 2024).*

Hicks et al, "Dynamic Software Updating", ACM, pp. 1-48 (Year: 2005).*

* cited by examiner

SYSTEM AND METHOD FOR TRANSMISSION OF SOFTWARE TO REMOTE ENVIRONMENTS

FIELD OF THE INVENTION

The present invention generally relates to the field of virtual environments. In particular, the present invention is directed to systems and methods for transmission of software to remote environments.

BACKGROUND

Virtual environments may be susceptible to modification or alteration without the consent or knowledge of the user. In addition virtual environments located in remote regions may fail to contain adequate network connections necessary to receive or transmit information. Current systems that transmit modifications to virtual environment lack the proper security to prevent tampering and lack the capabilities to transmit information on unreliable networks.

SUMMARY OF THE DISCLOSURE

In an aspect a system for transmission of software to remote environments is described. The system includes at least a processor and a memory communicatively connected to the at least a processor. The memory contains instructions configuring the at least a processor to receive update data for use in one or more operating environments, identify at least one operating environment for receipt of the update data, divide the update data into a plurality of data bundles, transmit the plurality of data bundles to the at least one operating environment, wherein transmitting the plurality of data bundles includes identifying a plurality of participating nodes for transmission of the plurality of data bundles and transmitting each data bundle of the plurality of data bundles with each participating node of the plurality of participating nodes and record the transmission on a central log.

In another aspect a method for transmission of software to remote environments is described. The method includes receiving, by at least a processor, update data for use in one or more operating environments, identifying, by the at least a processor, at least one operating environment for receipt of the update data, dividing, by the at least a processor, the update data into a plurality of data bundles transmitting, by the at least a processor, the plurality of data bundles to the at least one operating environment, wherein transmitting the plurality of data bundles includes identifying a plurality of participating nodes for transmission of the plurality of data bundles and transmitting each data bundle of the plurality of data bundles with each participating node of the plurality of participating nodes and recording, by the at least a processor, the transmission on a central log.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
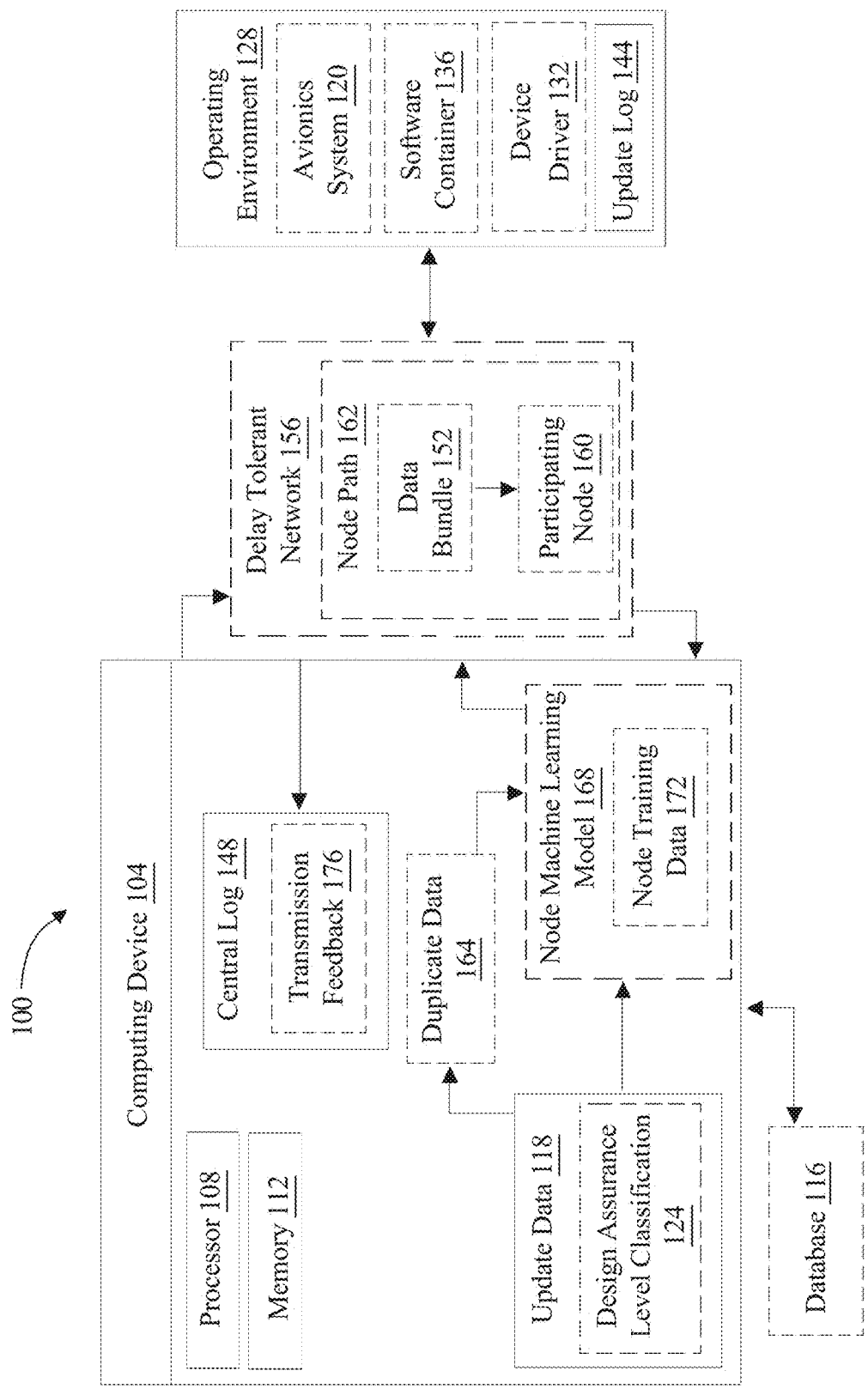
FIG. 1 is a block diagram illustration an exemplary embodiment of a system for transmission of software to remote environments.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for transmission of software to remote environments. In an embodiment system may include a computing device configured to identify operating environments for receipt of update data, determine a node path for the update data and transmit the update data through one or more networks to the operating environment using the node path.

Aspects of the present disclosure can be used to ensure security wherein only operating environments that are deemed secure and/or compliant may be trusted for receipt of update data. Aspects of this disclosure include a Store-and-forward communications architecture in which source nodes send DTN bundles through a network to destination nodes. In one or more embodiments, aspects for the current disclosure allow for traceability of data in order to ensure security. In one or more embodiments, aspects of this disclosure further allow for the use of multiple network channels in order to ensure transmission of data. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "1D6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatdn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $0(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Referring now to FIG. 1, A system 100 for transmission of software to remote environments is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, System 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, system 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or more embodiments, host circuit may carry out one or more processes as described in this disclosure intended for computing device 104.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, processor 108 is configured to receive update data 118. "Update data" for the purposes of this disclosure is information used to modify, enhance, correct, or otherwise alter an operation, functionality, feature, or performance of an existing computer software computer application, firmware, or hardware component within a designated operating environment. For example, and without limitation, update data 118 may include an instruction or a set of instructions to add additional code to a software, to add additional features to a software, instructions to remove a software bug and the like. In one or more embodiments, update data 118 may include information such as but not limited to, additional software capabilities, additional system requirements, changes to one or more processes within a system, changes to the visual design of a system, changes to the user interface of a system and the like. In one or more embodiments, update data 118 may be used to correct instructions and/or code on a software, to modify the capability of a software and the like. In one or more embodiments, update data 118 may include information associated with the software that is to be modified. This may include but is not limited to, the name of the software, compatibility information, system requirements, the date in which update data 118 was generated for the software, the version number of update data 118, information indicating potential changes to the software, information indicating additions to the software and the like. In one or more embodiments update data 118 may include modifications to a weapons system such as but not limited to, guided missile systems, smart bombs, automated defense systems, unmanned aerial vehicles, threat identification systems, Artificial intelligent algorithms, weapons, operational flight programs, avionics systems 120 and the like. In one or more embodiments, update data 118 may include modifications to an operating system, modifications to an operating system used for aviation, modifications to an aviation system, modifications to aircraft systems and the like. In one or more embodiments update data 118 may include patches to a system or software. A "patch" for the purposes of this disclosure is a set of instructions or code designed to fix specific issues or to improve issues within an existing system. In one or more embodiments, patches may include instructions to modify a code with a faulty system, instructions to make one or more processes more efficient, modifications to security vulnerabilities within a system, modifications to faulty code and the like. In one or more embodiments, patches may be used to address existing issues within a system in order to repair the existing issues.

With continued reference to FIG. 1, update data 118 may be iteratively scanned for vulnerabilities, monitored for compliance checks and the like. In one or more embodiments, additions or updates to update 118 may be logged to ensure that any modifications or changes to update 118 are monitored. In one or more embodiments, update data may include a digital signature such as any digital signature as described in this disclosure indicating that update data 118 has been tested. In one or more embodiments, the source of the digital signature may indicate the source of a change within update data, the source certifying update data 118 and the like. In one or more embodiments, system 100 may utilize a continuous integration/continuous deployment pipeline in order to facilitate testing of update data and ensuring the safety of update data 118. IN one or more embodiments, in a continuous integration (CI) pipeline, changes are automatically built and tested to ensure that that there are no software related issues. In one or more embodiments, testing update data 118 may allow for individuals to certify that update data will not cause a software to malfunction. In one or more embodiments, update data may be iteratively monitored and tested in order to ensure that update data 118 is suitable for a software. In one or more embodiments, monitoring and testing may be logged within a central log (as described in detail below) to ensure that changes are recorded. In one or more embodiments, in a continuous deployment (CD) pipeline, changes to codes and/or software may be automatically implemented following testing. In one or more embodiments, update data 118 may be automatically transmitted to operating environments 128 following and implemented within operating environments 128. In one or more embodiments, following monitoring of update data 118, update data may be automatically transmitted to operating environments for use. In one or more embodiments, system 100 may implement a development security operations (DevSecOps) approach wherein security testing and compliance is automated. IN one or more embodiments, from creation until deployment, update data 118 may be monitored to ensure that update data 118 is suitable for use. In one or more embodiments, throughout a creation process of update data 188 changes, and the individuals making the changes, may be recorded in order to have a log off all changes to update data 118. In one or more embodiments, DevSecOps may allow for vulnerabilities to be tracked and/or to be spotted earlier on as continuous testing may catch an issue immediately after they are made. In one or more embodiments, DevSecOps may allow for increased reliability wherein software issue may be tracked and addressed prior to deployment. In one or more embodiments, update data 118 may be stored in artifact repositories wherein artifact repositories include centralized locations for storage and management of update data 118. In one or more embodiments, artifact repositories may include database 116 as described in this disclosure. In one or more embodiments, artifact repositories may allow individuals associated with update data 118 to store update data and make changes throughout the development cycle of update data 118.

With continued reference to FIG. 1, update data 118 may include a design assurance level (DAL) classification 124. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification 124 may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, update data 118 may contain a DAL certification similar to that of the software and/or software container that is to be modified. In one or more embodiments, a software container may contain software associated with aviation and/or military technology, wherein each software container may contain DAL classification 124. For example, and without limitation, a software container may include software such as engine control systems, inflight entertainment, missile guidance systems, fuel monitoring systems and the like.

With continued reference to FIG. 1, update data 118 may be configured for one or more operating environments 128. An "operating environment" for the purposes of this disclosure refers to the combination of hardware and software that allows a computer software to function or execute. For example, and without limitation, operating environment 128 may include an operating system, device drivers 132, virtual machines, software containers 136, software modules, executable programs and the like. In one or more embodiments, operating environment 128 may allow for the execution of computer software. In one or more embodiments, operating environments 128 may allow for the execution of software modules and/or software containers 136. software container 136 may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment 128 with appropriate data services and restrictions.

In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems 120, electronic flight bag (EFB) software, ground support equipment software, weather forecasting and reporting software, cockpit display rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container 136. In one or more embodiments, any data and/or information within software container 136 may be used to ensure proper execution of software module. In one or more embodiments, software container 136 may contain libraries, dependencies, and the like to ensure proper execution of software module. In one or more embodiments, software module may include an executable file. In one or more embodiments, software module may include third party application wherein $3^{rd}$ party applications may include software and/or application created and/or managed by a differing entity. In one or more embodiments, software module may include previously developed applications wherein the previously developed application are modified to interact with a particular environment. In one or more embodiments, software container 136 may allow for a third-party application and/or previously developed application to be deployed within multiple virtual environments and/or operating system. In one or more embodiments, software module may include a previously developed application and/or $3^{rd}$ party application wherein software module may be placed within software container 136 to allow for software module to operate within multiple environments. A "software container" for the purposes of this disclosure is an executable package that is capable of running software within an isolated space. For example, and without limitation, software container 136 may include a document drafting software wherein the software container 136 may contain any information, runtime environment and the like necessary to execute the document drafting software on more than one operating systems. In one or more embodiments, software containers 136 may create a virtualized environment wherein a software may run within the virtualized environment. In one or more embodiments, operating environment 128 may include a virtualized environment. A "virtualized environment," for the purposes of this disclosure is a system in which software may be isolated while still operating on a host operating system. For example, and without limitation, software container 136 may operate in a virtualized environment wherein a software within software container 136 may not communicate with the host operating system. In one or more embodiments, software container 136 may allow for OS virtualization wherein a software may be isolated from a host operating system while still sharing the host operating system kernel. An "Operating system (OS) level virtualization," for the purposes of this discourse is a system in which an operating system kernel allows the existence of multiple isolated environment. In OS virtualization, a software within software container 136 may not have access to resources of the host operating system. Instead, the software may only have access to the contents within software container 136. In one or more embodiments, operating environment 128 may include a host operating system. A "host operating system" for the purposes of this disclosure is a primary operating system running on processor 108. In one or more embodiments, software container 136 may be executed atop host operating system. In one or more embodiments, virtual operating systems may exist atop host operating system. In one or more embodiments, host operating system may include an operating system configured to allow instantiation of one or more software containers 136, one or more virtual machines and the like. In one or more embodiments, software container 136 may communicate with host operating system to receive resources from processor 108 and/or memory. In one or more embodiments, an ordinary software operating outside of a software container 136 may have access to various operating system resources such as but not limited to, processing capabilities, file systems, networks and the like. In contrast, a software operating within a software container 136 may only have access to the contents within the software container 136. This may include various files, network capabilities and the like. In one or more embodiments, a software within software container 136 may communicate with software container 136 wherein software container 136 may transmit the commands to the processor 108. In one or more embodiments, software container 136 may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container 136 may contain OS level virtualization wherein a software within software container 136 may be executed in a virtualized environment. In one or more embodiments, software container 136 may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container 136 may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 116, and the like. In one or more embodiments, a software within software container 136 may operate in a runtime environment wherein the software may be isolated from the host operating system. In one or more embodiments, software container 136 may allow for an application to be executed and/or deployed on multiple operating systems. In one or more embodiments, software container 136 may contain libraries, configuration files, binary code and/or any other information that is necessary to execute the application and/or software. In one or more embodiments, a software container 136 may contain some degree of independence from the operating system and/or host system wherein the software container 136 does not rely on the operating system for any information needed to properly deploy an application within software container 136. In one or more embodiments, operating systems may lack the proper functionalities to execute an application, wherein software container 136 may be used to ensure that any necessary functionalities, information, and the like are self-contained. In one or more embodiments, software container 136 may contain a container image, wherein the container image is a portable executable image combined with a manifest that is used by a container manager to deploy the container image on an operating environment 128 with appropriate data services and restrictions. In one or more embodiments, software container 136 may contain restrictions and/or instructions on how a software may communicate with the operating system in which it is deployed on. In one or more embodiments, software container 136 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools. In one or more embodiments, software container 136 may include any software container 136 as described in U.S. Nonprovisional application Ser. No. 18/395,210 filed on Dec. 12, 2023 entitled "SYSTEM AND METHOD FOR A SAFETY CRITICAL OPERATING ENVIRONMENT 128 CONTAINER ARCHITECTURE", and U.S. Nonprovisional application Ser. No. 18/443,570 filed on Feb. 16, 2024 entitled "SYSTEM AND METHODS FOR PROVIDING INTEROPERABLE NETWORKS AND COMMUNICATIONS", the entirety of which are incorporated herein by reference.

With continued reference to FIG. 1, update data 118 may be configured for one or more operating environments 128. In one or more embodiments, update data 118 may be configured for one or more operating environments 128 wherein update data 118 may be used to modify an existing operating system, modify a software module, modify a software, modify a software container 136, modify a device driver 132 and the like. In one or more embodiments, update data 118 may be configured for one or more operating environments 128 wherein information contained within update data 118 may be specific to the operating environment 128 in which modification is sought. In one or more embodiments, update data 118 may include information associated with the updating environment that is sought to be modified such as but not limited to, information associated with software, information associated with DAL classification 124 and the like. In one or more embodiments, each operating environment 128 may contain DAL classification 124 wherein update data 118 may contain the same DAL classification 124.

With continued reference to FIG. 1, update data 118 may include an update or modification for a device driver 132. A "device driver" also known as a "software driver" for the purposes of this disclosure is a software component configured to control a specific hardware device attached to a computing system. For example, and without limitation, device driver 132 may include a software configured to allow for communication between a storage device and a computing system. In one or more embodiments, device driver 132 may control how a particular hardware device communicates with the computer's operating system. In one or more embodiments, each hardware device on a computing system may contain a unique device driver 132 that controls how the hardware device communicates with the operating system and/or operating environment 128. In one or more embodiments, differing operating systems may communicate with hardware devices differently. Device drivers 132 may allow for hardware devices to communicate with differing operating systems. In one or more embodiments, device drivers 132 may control the communication between an operating system and a hardware device to ensure proper communication. In one or more embodiments, a device driver 132 may provide a software interface between a virtual environment and a hardware device. In one or more embodiments, update data 118 may include an update or modification for a device driver 132 wherein update may alter and/or update how communications are made between the virtual environment and the hardware device. In one or more embodiments, updates and/or modifications may allow for increased computing efficiency, decreased software related issues, increased communication reliability, and the like.

With continued reference to FIG. 1, update data 118 may be generated by a user, "User" for the purposes of this disclosure is an individual associated with operating environment 128 and/or a software within operating environment 128. For example, and without limitation user may include a computer technician, a software engineer, an agent of an entity associated with the creation and/or management of a software that is sought to be updated and the like. In one or more embodiments, a user may be tasked with creating update data 118 in order to update or modify an existing software. In one or more embodiments, a user may input instructions and/or code in order to modify one or more aspects of a software. In one or more embodiments, a software may contain various software related issues wherein update data 118 may include instructions to resolve the software related issues. In one or more embodiments, update data 118 may be generated by a user on computing device 104 and/or a remote device. In one or more embodiments, a remote device may include a device separate from computing device 104, such as but not limited to, a smart phone, a separate desktop computer, a computing device 104 in a differing location and the like. In one or more embodiments, update data 118 may be received from a distribution repository. A "distribution repository" for the purposes of this disclosure is a centralized location in which software is stored and made available for installation. In one or more embodiments, distribution repositories may serve as a central network or database in which users may be able to retrieve an install software and/or retrieve update data 118. In one or more embodiments, user may include a distribution management entity wherein the distribution management entity is responsible for deploying updates on systems and software. In one or more embodiments, distribution management entity may be responsible for ensuring that software is properly installed and/or modified on a system. In one or more embodiments, distribution management entities may be tasked with retrieving software such as update data and installing the software on an individual's system.

With continued reference to FIG. 1, processor 108 is configured to identify at least one operating environment 128 for receipt of update data 118. In one or more embodiments, processor 108 may be configured to determine operating environments 128 for receipt of update data 118 and subsequent modification. In one or more embodiments, operating environments 128 may be communicatively connected to a central server, database 116 and the like wherein processor 108 may be configured to identify and/or select operating environments 128 connected to the central server and/or database 116. In one or more embodiments, operating environments 128 may systemically and/or continuously communicate with a central server, database 116 and the like wherein processor 108 may be configured to identify operating environments 128 as a result. In one or more embodiments, operating environments 128 may continuously communicate with a central server, database 116, cloud and the like for updates and/or modifications. In one or more embodiments, a central server and/or database 116 may contain a list of operating environments 128 with a particular software, software module and the like wherein processor 108 may be configured to identify operating environments 128 as indicated within the list. In one or more embodiments, upon installation of a software within an operating environment 128, a computing system may communicate to computing device 104 and/or database 116 that the software has been installed. In one or more embodiments, operating environments 128 that have installed one or more software may be placed on a list indicating so. In one or more embodiments, database 116 may contain centralized logs that indicate which operating environments 128 currently have a particular software installed. In one or more embodiments, deployment tools such as Microsoft SCCM may be used to manage the installation of software across multiple devices wherein processor 108 may utilize the deployment tools to identify operating environments 128. In one or more embodiments, operating environments 128 may communicate with a central network wherein communication may include communication to receive update data 118. In one or more embodiments, upon installation of a software within operating environment 128, a computing system may communicate with a central network that the software has been installed. In one or more embodiments, processor 108 may contain a central network and/or database 116 with a plurality of operating environments 128 wherein each operating environment 128 may be associated with an installed software.

With continued reference to FIG. 1, in one or more embodiments, processor 108 may be configured to identify one or more operating environments 128 for receipt of update data 118 by determining a compliance of one or more operating environments 128 and identifying at least one operating environment 128 as a function of the compliance. In one or more embodiments, processor 108 is configured to verify a compliance of operating environment 128 with a plurality of pre-determined safety standards sourced from a trusted repository by monitoring an adherence of the operating environment 128 to a pre-defined operational rule. As used in this disclosure, a "compliance" is a data element measuring a conformance of operating environment 128 to established guidelines or specifications designed to ensure the safety and reliability of operating environment 128 (especially within operating environments where failure may lead to significant harm or loss) known as "safety standards." In some cases, compliance may include a quantitative value such as a score or a range of scores. In other cases, compliance may include one or more binary representations, for example, "1" and "0" or "TRUE" and "FALSE," wherein "1/TRUE" may indicate operating environment 128 is compliant with at least one corresponding safety standard and "0/FALSE" may indicate operating environment 128 is non-compliant with the at least one corresponding safety standard. A "trusted repository," for the purpose of this disclosure, is a trust entity e.g., a secure storage or even a trusted partition, wherein a plurality of safety standards are kept. In a non-limiting example, trusted repository may be considered authoritative and tamper-proof e.g., one or more secure databases, version control systems, and/or certified data centers. In an embodiment, processor 108 may be configured to evaluate compliance to ensure that operating environment 128 may perform all functions specified to at least one operational rule. In a non-limiting example, processor 108 may be configured to determine design assurance level classification (DAL) associated with operating environment to determine compliance.

With continued reference to FIG. 1, in some cases, compliance may include an assessment of operating environment's 128 conformance to at least one operational rule that dictate operating environments 128 behavior, known as the "adherence." In a non-limiting example, at least one operational rule may dictate how it must perform under various conditions to be considered compliant. In a non-limiting example, at least a processor 108 may be configured to verify the execution or safety of operating environment. In some cases, at least a processor 108 may assign a high score to operating environment 128 which executed without interference e.g., functions within its runtime without being interrupted or influenced by other processes or partitions, maintaining strict timing and performance as per its safety standards. In another non-limiting example, at least a processor 108 may be configured to check the integrity of data processed and/or data transmitted by operating environment 128 using one or more error-checking algorithm or secure data transmission protocols. In some cases, compliance may include DO-178C for avionics, ISO 26262 for automotive safety, IEC 61508 for industrial system safety, and/or the like. In some cases, a high compliance may indicate operating environment 128 adheres to standards e.g., RTCA/DO-178C for software in airborne systems. In some cases, high compliance may include a certification of ISO 27001. In a non-limiting example, operating environment such as a flight control system software may be rigorously tested and verified against DO-178C standard based on observed runtime behaviors through simulation and/or in-flight testing.

With continued reference to FIG. 1, processor 108 may be configured to identify one or more operating environments 128 as a function of DAL classification 124. In one or more embodiments, processor 108 may be configured to determine compliance as a function of DAL classification 124. In one or more embodiments, determining a compliance may include determining a DAL Classification 124 wherein operating environment 128 containing a similar DAL classification 124 to that of update data may be referred to as 'compliant'. In one or more embodiment, operating environments 128 that have been deemed to be compliant may be identified and/or selected for further authentication as described below. In one or more embodiments, a plurality of operating environments 128 may exist wherein each operating environment 128 may be associated with a particular DAL classification 124. For example, and without limitation, it may be the case that a central network and/or database 116 may be used for multiple differing software and/or operating environments 128 wherein each software and/or operating environment 128 may contain a particular DAL classification 124. In one or more embodiments, processor 108 may be configured to identify, and/or ensure compliance of, operating environments 128 based on DAL classification 124. In one or more embodiments, each operating environment 128 may contain a DAL classification 124 wherein processor 108 may be configured to identify operating environments 128 with similar DAL classifications 124 to that listed within update data 118. In one or more embodiments, processor 108 may be configured to determine a DAL classification 124 of operating environments 128 and identify at least one operating environment 128 as a function of the DAL classification 124. In one or more embodiments, identification may further include a selection of operating environments 128 suitable to receive updated data. In one or more embodiments, update data 118 may include information associated with the software and/or type of operating environment 128 sough to be modified wherein processor 108 may be configured to select operating environments 128 based on the information provided. In one or more embodiments, update data 118 may include the name of the operating environments 128 to be updated, the category, the DAL classification 124 and the like. In one or more embodiments, operating environment 128 and/or software may contain unique identifiers to identify operating environments 128 and/or categories of operating environments 128. In one or more embodiments, update data 118 may contain the unique identifier as well wherein operating environments 128 may be identified and/or selected as a result. In one or more embodiments, identification of operating environments 128 may ensure that update data 118 is being transmitted to the correct operating environments 128. In one or more embodiments, identifying one or more operating environments 128 may include comparing DAL classification 124 of update date to DAL classification 124 of one or more operating environments 128. In an embodiment, update data 118 and operating environments 128 containing differing DAL classifications 124 may indicate that the update data 118 the operating environment 128 is not suitable for update data 118. In one or more embodiments, a database 116 may include a list of systems and/or operating environments 128 wherein processor 108 may be configured to identify operating environments 128 based on DAL classification 124, based on unique identifiers within update data 118, based on the class of operating environments 128 as indicated within update data 118 and the like. In one or more embodiments, operating environments 128 may be identified and differed from one another through the use of unique identifiers, IP addresses and the like.

With continued reference to FIG. 1, processor 108 may be configured to identify operating environments 128 as a function of an update request. An "update request" for the purposes of this disclosure is a communication made by one or more operating environments 128 seeking receipt of update data 118. For example, and without limitation, operating environments 128 may transmit an update request to determine if new update data has been created. In one or more embodiments, operating environments may communicate with a cloud network to continuously, periodically and/or systematically request update data 118. In one or more embodiments, operating environments 128 may transmit update requests to a cloud network and/or to computing device 104 wherein processor 108 may be configured to identify operating environment 128 and transmit update data 118 if conditions allow. In one or more embodiments, update data 118 may be stored on a central network and/or database 116 until update request is received. In one or more embodiments, following receipt of update request, processor 108 may identify the operating environment seeking update data 119 and authenticate operating environment 128 as described in further detail below.

With continued reference to FIG. 1, processor 108 is configured to authenticate operating environments 128 that have been identified. In one or more embodiments, processor 108 may identify at least one operating environment 128 that requires receipt of update data 118 and authenticate the at least one operating environment 128. In an embodiment, operating environments 128 may be identified yet may not be authenticated such that they are not suitable for receipt of update data 118. In one or more embodiments, an authentication process may include a determination of whether one or more data sets (e.g. operating environments 128 and/or information associated with operating environments 128) are suitable for processing. In one or more embodiments, authentication of operating environments 128 may include a process in which computing device 104 may determine if the identified operating environments 128 are suitable for receipt of update data 118. In one or more embodiments, an authentication of one or more operating environments 128 may include a process in order to ensure that operating environments 128 have not been tampered with and/or operating environments 128 with invalid credentials do not receive update data 118. In an embodiment, update data 118 may contain sensitive information wherein authentication of operating environments 128 may ensure the trustworthiness of the recipient in possession and/or in control of operating environment 128.

With continued reference to FIG. 1, authentication of operating environment 128 may include identification of unique identifiers and/or a comparison of the unique identifier associated with the operating environment 128 with a list contained within database 116. In one or more embodiments, database 116 may contain a list of unique identifiers (and/or allowable IP addresses) associated with operating environments 128 wherein the lack of a particular unique identifier may indicate that the operating environment 128 lacks proper authentication to receive update data 118. In one or more embodiments, authentication of operating environments 128 may include the transmission of an encrypted data file to the operating environment 128 and receipt of the unencrypted data file. In an embodiment, receipt of the unencrypted data file may indicate that the operating environment 128 contains the requisite decryption key to decrypt the data file. In one or more embodiments, authentication may include identification of digital signatures, checksums, and the like. In one or more embodiments, processor 108 may be configured to determine if an operating environment 128 has been tampered with through identification and validation of digital signature. In one or more embodiments, processor 108 may be configured to receive a digital signature from operating environment 128 and authenticate the digital signature. In one or more embodiments, each operating environment 128 may contain their own session identification wherein lack a session identification and/or lack of a proper session identification may indicate that the operating environment 128 has not been authenticated.

With continued reference to FIG. 1, each operating environment 128 may contain an update log 144. "Update log" for the purposes of this disclosure is information associated with the operating environment 128 that can be used to ensure authentication of an operating environment 128 for receipt of update data 118. For example, and without limitation, update log 144 may include the name or unique identifier of the operating environment 128. In one or more embodiments, update log 144 may include changes made to the operating environment 128 such as updates, modifications, the addition of instructions and/or code and the like. In one or more embodiments, update log 144 may include changes made to operating environment 128. In one or more embodiments update log 144 may include a date and time stamp for each change made to operating environment 128. In one or more embodiments, update log 144 may include previously generated update data 118 and a correlated time stamp as to when the previously generated update data 118 was received. In one or more embodiments, in each iteration a differing update data 118 may be generated for transmission wherein operating environments 128 may append update log 144 to include the recently received update data 118. In one or more embodiments, update log 144 may further include unique identifier associated with update data 118, digital signatures, and the like. In one or more embodiments, update log 144 may include modifications made to operating environment 128 and correlated time stamps. In one or more embodiments, update log 144 may be write only and/or read only wherein data may not be modified and/or removed to ensure the update log 144 is not tampered. In one or more embodiments, update log 144 may include the source of the modifications such as the source of transmission of the previously received update data 118. This may include IP addresses, digital signatures that can be used to authenticate a source and the like. In one or more embodiments, update log 144 may include a hash of the executable of operating environment 128 and/or a software within operating environment 128. In one or more embodiments, update log 144 may include a hash of the code using for execution of operating environment 128. In one or more embodiments, update log 144 may include a hash of the data within update log 144. In one or more embodiments, update log 144 may include access history wherein the access history indicates the previous accessing of update log 144 and associated timestamps. In an embodiment, an unrecognized access of update log 144 may indicate potential tampering of update log 144. In one or more embodiments, elements within update log 144 may include time stamps, such as timestamps indicating a date of receipt, a date of modification and the like. In one or more embodiments, prior to transmission of update data 118, processor 108 may request update log 144 from one or more operating environment 128 for review. In one or more embodiments, prior to transmission of update data 118, processor 108 may be configured to determine the authenticity of operating environment 128 through update log 144.

With continued reference to FIG. 1, processor 108 may be configured to compare update log 144 to a central log 148. "Central log" for the purposes of this disclosure is information associated within update log 144 that has been received or generated on a previous instance and secured on database 116. For example, and without limitation, processor 108 may receive update log 144 and store it on a server and/or database 116 and use the update log 144 as a central log 148. In another non limiting example, processor 108 may receive update log 144 on a previous iteration and store update log 144 on database 116 as central log 148. In one or more embodiments, processor 108 may be configured to generate central log 148 similar to that of update log 144 where a second set of information may be stored on a remote database 116 away from operating environment 128. In one or more embodiments, central log 148 may be used to ensure that update log 144 has not been tampered with since a previous iteration of the processing. In one or embodiments, following modification and/or changes to operating environment 128, both central log 148 and update log 144 may be simultaneously updated. In one or more embodiments, each authorized addition to update log 144 may be added to central log 148 as well. In one or more embodiments, following authorized changes (e.g., through the receipt of update data 118) made to operating environment 128, both update log 144 and central log 148 may be updated and/or appended to. In one or more embodiments, central log 148 may be used to ensure that unauthorized changes have not been made to update log 144. In one or more embodiments, changes to operating environment 128 may be documented within update log 144 and central log 148 with a corresponding time stamp wherein differing data between central log 148 and update log 144 may indicate that an operating environment 128 has been modified without permission. In one or more embodiments, following transmission of update data 118 in each iteration, processor 108 may be configured to append to central log 148 and update log 144 in order to document that changes have been made. In one or more embodiments, authentication of operating environment 128 includes a comparison between central log 148 and update log 144. In one or more embodiments, inconsistencies between update log 144 and central log 148 may indicate that an operating environment 128 has been tampered with and/or has not been properly validated. In one or more embodiments, processor 108 may be configured to compare update log 144 and central log 148 to determine a degree of match wherein the degree of match may indicate authentication of operating environment 128. In one or more embodiments, central log 148 may be located on a secure database 116, network server and the like. In one or more embodiments, central log 148 may be encrypted to prevent viewing of central log 148 by unauthorized users. In one or more embodiments, central log 148 may be read only and/or write only wherein data may not modified and/or deleted, only added. In one or more embodiments, central log 148 may have 'append-only access' wherein only data may be added and not removed. In one or more embodiments, file restrictions on central log 148 may ensure that data may only be added to the end of central log 148 wherein a user may not insert information within central log 148. In one or more embodiments, central log 148 may be stored on an immutable sequential listing as described in further detail below to ensure that data is not removed and/or modified. In one or more embodiments, central log may be "implemented as" the "immutable sequential listing" wherein each transmission/activity may be recorded on the immutable sequential listing. In one or more embodiments, central log 148 may include an immutable data structure wherein the immutable data structure includes a data structure in which data cannot be modified or deleted. In one or more embodiments, in an immutable data structure, data may only be added to the end of the immutable data structure and therefore data cannot be altered or changed. In one or more embodiments, processing may implement checksum and/or hashing mechanisms within update log 144 and/or central log 148 wherein modification to update log 144 and/or central log 148 may cause the checksum and/or hashing mechanism to contain differing information. In one or more embodiments, central log 148 may include a checksum and/or hash wherein update log 144 may be compared to the checksum and/or hash. In one or more embodiments, processor 108 may be configured to implement versioning of update log 144 and/or central log 148 wherein modification of update log 144 and/or central log 148 may cause a new version to be created. In one or more embodiments, processor 108 may be configured to compare versions of update log 144 and central log 148 wherein differing versions may indicate tampering. In one or more embodiments, both central log 148 and update log 144 may contain access history indicating previous dates in which the data has been accessed. In one or more embodiments, differing access history may indicate that update log 144 may have been tampered.

With continued reference to FIG. 1, central log 148 may contain one or more timestamps that have been generated by a trusted time stamp authority and cryptographically signed to ensure its authenticity. In one or more embodiments, a time stamp that has been generated by a trust time stamp authority and cryptographically signed by referred to as an 'attested timestamp.' In one or more embodiments, central log 148 may contain one or more attested timestamps indicating modifications and/or updates made to operating environment 128. In an embodiment, following receipt of update data 118, an attested time stamp may be created wherein central log 148 may contain a plurality of attested timestamps from previous iterations. In one or more embodiments, attested time stamps may include timestamps associated with a files creation, a files most recent modification and the like. In one or more embodiment, comparing update log 144 to central log 148 may include comparing time stamps within update log 144 to attested time stamps within central log 148. In one or more embodiments, an attested time stamp within central log 148 may be associated with the file creation and/or last modification of update log 144 wherein processor 108 may be configured to compare attested time stamp to update log 144. In one or more embodiments, comparison of central log 148 and update log 144 may include the process of trusted time stamping. In one or more embodiments, trusted timestamping may include the process of securely keeping track of various times associated with a data file. In one or more embodiments, trusted timestamping may include the process of ensuring that timestamps are immutable such that they cannot be tampered with. In one or more embodiments, trusted timestamping may include submission of a request to a trusted time stamp authority. The time stamp authority may then generate a timestamp for the given data, such as update log 144, in the form of a digital signature. The timestamp may be cryptographically linked to the data to ensure security. In one or more embodiments, ensuring the authenticity of update log 144 may include comparing a timestamp within update log 144 to the timestamp given by the timestamp authority.

As used in this disclosure, "verification" is a process of ensuring that which is being "verified" complies with certain constraints, for example without limitation system requirements, regulations, and the like. In some cases, verification may include comparing a product, such as without limitation update log 144 against one or more acceptance criteria. For example, in some cases, update log 144 may be required to contain similar information to that of central log 148. Ensuring that update log 144 is in compliance with acceptance criteria may, in some cases, constitute verification. In some cases, verification may include ensuring that data is complete, for example that all required data types are present, readable, uncorrupted, and/or otherwise useful for computing device 104. In some cases, some or all verification processes may be performed by computing device 104. In some cases, at least a machine-learning process, for example a machine-learning model, may be used to verify. Computing device 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation update log 144 against a specification. In some cases, computing device 104 may be additionally configured to validate a product by validating constituent sub-products. In some embodiments, computing device 104 may be configured to validate any product or data, for example without limitation update log 144. In some cases, at least a machine-learning process, for example a machine-learning model, may be used to validate by computing device 104. Computing device 104 may use any machine-learning process described in this disclosure for this or any other function.

With continued reference to FIG. 1, following authentication and/or selection of one or more operating environments 128, processor 108 is configured to transmit update data 118 to one or more operating environments 128. In an embodiment, only operating environments 128 that have been determined to be authenticated may be eligible for receipt of update data 118. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. In one or more embodiments, processor 108 may be configured to transmit update data 118 to database 116 and/or a network server and transmit update data 118 from the database 116 to one or more operating environments 128. In one or more embodiments, update data 118 may be stored on database 116, wherein processor 108 may be configured to notify authenticated operating environments 128 that an update data 118 is ready to be received. In one or more embodiment, update data 118 may first be transmitted to a database 116 to ensure proper transmission to one or more operating environments 128.

With continued reference to FIG. 1, processor 108 is configured to divide update data 118 into a plurality of data bundles 152. In one or more embodiments, processor 108 may be configured to transmit update data 118 using a delay tolerant network 156. Delay tolerant network 156 (DTN) is a network communication system in which data is transmitted into smaller units in order to facilitate transmission of data in unreliable or intermittent networks. For example, and without limitation, operating environment 128 may be executed on a remote device located within the ocean or on an aircraft wherein network connectivity may be intermittent and/or slow. In another non limiting example, operating environments 128 may exist on remote devices that may be located beneath the surface of the earth wherein network connections may be sporadic and/or intermittent. In one or more embodiments, update data 118 may be divided into a plurality of data bundles 152 wherein each data bundles 152 includes a portion of update data 118. A "data bundle" for the purposes of this disclosure is a unit of data that is encapsulated for transmission. For example and without limitation, data bundle 152 may contain a portion of update data 118 wherein the portion of update data may be transmitted to operating environment 128. In an embodiment, multiple portions of update data 118 may be transmitted to operating environment 128 wherein operating environment 128 may receive the portions and reconstruct update data 118 from the data bundles 152. In one or more embodiments, data bundles 152 may be transmitted independently, such that update data 118 may be transmitted in portions. In one or more embodiments, data bundles 152 may be independently encrypted to ensure further security. In one or more embodiments, processor 108 may be configured to create a plurality of data bundles 152 and encrypt each data bundle 152. In one or more embodiments, processor 108 may be configured to assign a unique identifier to each data bundle 152, wherein the unique identifier may be used to determine the placement of each data bundle 152 when they are all ultimately received and combined to create update data 118. In one or more embodiments, unique identifiers associated with data bundles 152 may be encrypted to ensure that an unwanted recipient may not intercept data bundles 152 and combine them to create update data 118. In one or more embodiments, both the data bundles 152 and the unique identifiers may be encrypted with similar or differing encryption processes to ensure a two level system of protection.

With continued reference to FIG. 1, processor 108 may divide update data 118 into a plurality of data bundles 152 using fragmentation. In one or more embodiments, fragmentation may include a process in which data is divided into smaller chucks or packets, wherein each chunk or packet is encapsulated into a separate data bundle 152. In one or more embodiments, fragmentation may occur that the network or transport layer by protocols designed for delay tolerant network 156*ing* environments. In one or more embodiments, protocols used for fragmentation may include bundle protocols (BP) specified by the internet engineering task force. In one or more embodiments, the size of fragments or data bundles 152 may be determined based on real-time network conditions, such as bandwidth, node buffer, latency and the like. In one or more embodiments, processor may fragment update data into multiple fragments prior to transmission wherein each fragment may be transported as a data bundle 152. In one or more embodiments, fragmentation may occur prior to transmission and/or at the bundle layer itself. In one or more embodiments, data bundles 152 may first be created for transmission wherein data bundles 152 may further be fragmented into sub bundles during transmission based on network availability, latency and the like. In one or more embodiments, a fragmentation process may include dynamic fragmentation. In one or more embodiments, dynamic fragmentation may include a process in which the size and number of data bundles 152 are determined based on real-time network conditions such as available bandwidth, node buffer and the like. In one or more embodiments, processor, a central server and/or the network responsible for transmission may fragment update data 118 based on network availability. In one or more embodiments, each data bundle 152 may contain a portion of update data 118 wherein, when aggregated the plurality of data bundles 152 may be used to reconstruct update data 118 at the destination such as operating environment 128.

With continued reference to FIG. 1, processor 108 may be configured to duplicate update data 118 and/or portions thereof. In one or more embodiments, a duplicate of update data 118 may include a second update data containing similar information as a first update data. In one or more embodiments, a duplicate of update data 118 (referred to hereafter as 'duplicate data') may include substantially similar information, file size, file type and the like as update data 118. In one or more embodiments, processor may be configured to generate duplicate data 164 and transmit duplicate data 164 along with and/or simultaneous with update data 118. In one or more embodiments, processor 108 may be configured to generate multiple duplicate data 164 and transmit the multiple duplicate data 164. In one or more embodiments, processor 108 may be configured to generate duplicate data 164 and/or multiple duplicate data 164 and generate a plurality of data bundles 152 from the duplicate data 164. In one or more embodiments, processor 108 may divide update data 118 and duplicate data 164 into a plurality of data bundles 152. In one or more embodiments, update data 118 and duplicate data 164 may be divided similarly wherein each data bundle 152 created from update data may have an associated corresponding copy or duplicate created by duplicate data 164. In one or more embodiments, processor 108 may create duplicate data 164 in order to generated redundancy data bundles 152 and/or data bundles 152 containing the same information. In one or more embodiments, redundant data bundles 152 may ensure proper transmission of update data wherein a receiver, such as operating environment may compare duplicate data 164 to update data to ensure that the information was properly received. In one or more embodiments, processor 108 may be configured to duplicate or copy update data 118 following division into data bundles 152 wherein copies or duplicates of data bundles 152 may be created. In one or more embodiments, each data bundle 152 of a plurality of data bundles 152 may contain one or more corresponding copies having similar information. In one or more embodiments, processor may create duplicate data 164 wherein data bundles 152 created from duplicate data 164 may differ in size from those created from update data 118. For example, and without limitation, a first data bundle 152 created form update data may be 5 Megabytes in size whereas a first data bundle 152 create from duplicate data 164 may be 7 megabytes in size. In one or more embodiments, processor may create one or more duplicate data 164 in order to ensure proper transmission of update data to operating environment. In one or more embodiments, operating environment may compare update data to duplicates following receipt wherein changes between update data 118 and the duplicates may indicate an issue during the transmission process.

With continued reference to FIG. 1, in one or more embodiments, data bundles 152 may be transmitted across participating nodes 160. A "participating node" for the purposes of this disclosure refers to a device or a network that participates in the communication process between computing device 104 and operating environment 128. In one or more embodiments, participating nodes 160 may be responsible for the transmission of data bundles 152. In one or more embodiments, participating nodes 160 may include networks, devices and/or remote devices that can receive, store and transmit data bundles 152. In one or more embodiments, operating environments 128 may be located on device with sporadic and/or intermittent network connections wherein data bundles 152 may be transmitted across participating nodes 160 until they arrive at their final destination. In one or more embodiments, processor 108 may be configured to determine a route along one or more participating nodes 160 between a source node and a destination node. In one or more embodiments, the source node may include the source of the transmission of update data 118 and/or data bundles 152 such as computing device 104 and/or database 116. In one or more embodiments, the source node may include the first participating node 160 in a sequence of nodes and/or the initial location of update data 118. In one or more embodiments, the destination node includes the final destination of update data 118 and/or data bundles 152 such as a device in which operating environment 128 may be running on. In one or more embodiments, the destination node may include the last participating node 162 in a sequence of nodes and/or the final destination of update data 118 such as operating environment. In one or more embodiments, processor 108 may be configured to determine a path among participating nodes 160, wherein data bundles 152 may be transmitted to a corresponding node until they reach their final destination. In one or more embodiments, processor 108 may be configured to generate and/or determine a node path 162. A "node path" for the purposes of this disclosure is a route for a data bundle 152 to travel along in order to be transmitted from a source node to a destination mode. For example, and without limitation node path 162 may include a plurality of participating nodes 160 in which data bundle 152 may be transmitted to until the data bundle 152 has reached the final destination (e.g., operating environment 128) and/or destination node. In one or more embodiments node paths 162 may indicate a set of participating nodes 160 in which data bundle 152 may be transferred to and from until data bundle 152 has reached a final destination. In one or more embodiments, routing algorithms may be used to determine the most optical path from a source node to a destination node. In one or more embodiments, routing algorithms may depend on the connection between participating nodes 160, the storage capacity of participating nodes 160, the historical success of a participating node 160 and the like. In one or more embodiments, processor 108 may be configured to determine one or more paths in which data bundles 152 may be transmitted wherein the paths include one or more nodes connected to one another. In one or more embodiments, during instances in which a connection is made, data may be transferred one or more participating node 160 to another until the data bundles 152 arrive at their final destination.

With continued reference to FIG. 1, processor 108 may use predictive modeling to determine which participating nodes 160 should be selected for transmission of data bundles 152. In one or more embodiments, predictive modeling may allow for predictions of future and/or anticipated network connections based on historical data, wherein participating nodes 160 may be selected as a result. In one or more embodiments, processor 108 may use adaptive modeling to reroute data bundles 152 in order to increase the transmission rate of data bundles 152. In one or more embodiments, processor 108 may be configured to select nodes based on their ability to transmit data. In one or more embodiments, processor 108 may assign data bundles 152 to selected participating nodes 160 based on the size of data bundles 152 and the capacity of participating nodes 160. In one or more embodiments, processor 108 may utilize predictive modeling, adaptive modeling, selection of nodes and the like as a function of a machine learning model. The machine learning model may include any machine learning model as described in this disclosure. Processor 108 may use a machine learning module, such as a node machine learning module for the purposes of this disclosure, to implement one or more algorithms or generate one or more machine-learning models, such as a node machine learning model 168 to determine one or more paths for data bundles 152 to be transmitted along. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as node machine learning module, may be used to create node machine learning model 168 and/or any other machine learning model using training data. Node machine learning model 168 may be trained by correlated inputs and outputs of training data. Training data may be data sets that have already been converted from raw data whether manually, by machine, or any other method. Node training data 172 may be stored in database 116. Node training data 172 may also be retrieved from database 116. In some cases node machine learning model 168 may be trained iteratively using previous inputs correlated to previous outputs. For example, processor 108 may be configured to store participating node 160 paths and their corresponding transmission from current iterations to train the machine learning model. In some cases, the machine learning model may be trained based on user input. For example, a user may indicate that determined paths or routes were unreliable and/or slow wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, node training data 172 may include a plurality of source nodes and destination nodes correlated to a plurality of node paths 162. In one or more embodiments source nodes and destination nodes may be determined based on the source of the transmission (i.e., processor and/or a central server) and the destination of the transmission (i.e. operating environment 128). In an embodiment, node path 162 may include a route from a source node to a destination node. In one or more embodiments, node machine learning model 168 may be configured to output node paths 162 based on source nodes and destination nodes. In one or more embodiments, node machine learning model 168 may be trained using historical data such as transmissions made on previous iterations. In an embodiment, historical data may indicate the most optical node paths 162 between source node and destination node. In one or more embodiments, following each iteration of the processing of system 100, node paths 162 and their corresponding transmission time may be used to iteratively train machine learning model in order to create more efficient node paths 162. In one or more embodiments, training of node machine learning model 168 may allow for selection of more efficient node paths 162 and may increase the reliability of a transmission. In one or more embodiments, each participating node 160 may include a correlated storage capacity, wherein the correlated storage capacity may indicate the maximum storage size of a data bundles 152. In one or more embodiments, processor 108 may be configured to assign data bundles 152 to node paths 162 based on storage size using node machine learning model 168. In one or more embodiments, processor 108 may be configured to identify a plurality of participating nodes 160 on a network, wherein processes may be configured to determine node path 162 as a function of the plurality of participating nodes 160. In one or more embodiments, node machine learning model 168 may be configured to receive plurality of participating nodes 160, including source node and destination node wherein node machine learning model 168 may be configured to generate node path 162 from source node to destination node. In one or more embodiments, node machine learning model 168 may be trained on node training data 172 wherein node training data 172 contains a plurality of source nodes and destination nodes correlated to a plurality of node paths 162. In one or more embodiments, processor may be configured to identify source nodes and destination nodes based on the operating environment 128, wherein the identified operating environment may contain a corresponding destinated node. In one or more embodiments, processor 108 and/or computing device 104 may be associated with a source node. In one or more embodiments, processor 108 may be configured to determine node path 162 as a function of node machine learning model 168 wherein node path 162 may indicate a path for update data to be transmitted from computing device 104 and/or a central server to operating environment 128. In one or more embodiments, processor 108 may identify a plurality of participating nodes 160 to be used for transmission of update data 118 wherein node path 162 may contain the plurality of participating nodes 160 and a path along the plurality of participating nodes 160.

With continued reference to FIG. 1, nodes within a network may be found and/or identified through intermittent connectivity wherein nodes may come into contact within each other when they are within a communication range. In one or more embodiments, when nodes come into contact with each other, the nodes share information such that data is transferred from one node to another. One or more embodiments, nodes may communicate with other nodes based on routing protocols. In one or more embodiments, participating nodes 160 may be found using periodic beaconing or encounter logging such that data may be transferred from one node to another node.

With continued reference to FIG. 1, each participating node 160 may be configured to transmit a single data bundle 152. In one or more embodiments, each data bundle 152 of the plurality of data bundles 152 is transmitting with a participating node 160. In one or more embodiments, a plurality of participating nodes 160 may exist wherein each participating node 160 may be responsible for at least one data bundle 152. In one or more embodiments, a plurality of node paths 162 may exist and/or be generated wherein each node path 162 may be configured for a singular data bundle 152. In one or more embodiments, data bundles 152 may be transmitted along a singular node path 162 wherein each node is configured to transmit a data bundle 152 and receive a corresponding data bundle 152 for transmission. In one or more embodiments, data bundles 152 may be transmitted individually along node path 162 wherein each participating node 160 may acquire and transmit a singular data bundle 152 at a time.

With continued reference to FIG. 1, nodes and/or participating nodes 160 may transmit information using different communication and/or network channels. In one or more embodiments, nodes may transmit information over wireless fidelity (Wi-Fi). In one or more embodiments, data may be transmitted over Wi-Fi networks in areas with widespread Wi-Fi coverage. In one or more embodiments, nodes may transmit information through Bluetooth wherein information may be transmitted to devices near one another. In one or more embodiments, nodes may transmit information along cellular networks such as 2G, 3G, 4G and/or 5G networks. In one or more embodiments, information may be transmitted between nodes using satellite communication wherein nodes may be transmitted between each other in remote areas and/or over long distances. In one or more embodiments, nodes may communicate using Ad Hoc networks wherein nodes may communicate with each other directly without a centralized infrastructure. In one or more embodiments, nodes may transmit information on tactical radio networks operating on differing frequency bands. In one or more embodiments, nodes may transmit information and/or data bundles 152 using mesh networks, secure communication protocols, UAV relays and the like. In one or more embodiments, nodes may transmit information using any of the network channels as described above. In one or more embodiments, data bundles 152 may be transmitted across differing network channels, wherein for example, a data bundle 152 may first be transmitted through Wi-Fi and then over satellite. In one or more embodiments, delay tolerant network 156*ing* may include a heterogenous network where nodes may communicate with each other using various communication technologies. In one or more embodiments, data bundles 152 may be adaptable to multiple network channels wherein data bundles 152 may be transmitted over multiple differing network channels. In one or more embodiments, processor and/or another computing system may find participating nodes 160 amongst multiple networks wherein data bundles 152 may be stored in nodes until a participating node 160 is available to receive data bundle 152. In one or more embodiments, plurality of data bundles 152 may be transmitted through multiple differing network channels as described above. In one or more embodiments, transmitting the plurality of data bundles 152 to the at least one operating environment includes interleaving the plurality of data bundles 152 through multiple network channels. In one or more embodiments, an "interleaving" process as described in this disclosure refers to the use of multiple differing network channels to transmit data bundle 152 from a source node to a destination node. For example, and without limitation, interleaving may include the process of transmitting data bundle 152 from a first node to a second node using Wi-Fi and from the second node to the third node using satellite networks. In one or more embodiments, interleaving may include network interleaving wherein network interleaving includes a process in which data is distributed across multiple networks. In one or more embodiments, network interleaving may allow for improved reliability of transmission of update data 118 wherein update data 118 may be transmitted through differing routes when a network is unavailable or no longer reliable at a particular point during transmission. In one or more embodiments, network interleaving may increase transmission speed wherein networks with high bandwidth may be used when available. In one or more embodiments, network interleaving may further allow for faster data transmission wherein data bundles may be transmitted across differing networks based on congestion, bandwidth and the like. In one or more embodiments, network interleaving may be used for redundancy wherein similar update data 118 such as duplicate data 164 may be transmitted over differing networks to ensure that the transmission is received. In one or more embodiments, network interleaving may allow for load balancing wherein data may be distributed across multiple networks in order to reduce loads on each network.

With continued reference to FIG. 1, duplicate data 164 and update data may be transmitted to operating environment. In one or more embodiments, duplicate data 164 and update data 118 may be transmitted across participating nodes 160. In one or more embodiments, operating environment may be configured to receive duplicate data 164 and update data 118 and compare both to determine if there were any errors in transmission. In one or more embodiments, update data and duplicate data 164 may be transmitted using store-and-forward routing wherein nodes may temporarily store data bundles 152 until participating node 160 is found. In one or more embodiments, in store-and-forward routing, nodes store information until a suitable node is found. In one or more embodiments, store-and-forward networking may be useful in instances in which a continuous communication cannot be made from the source node to the destination node. In one or more embodiments, in instances in which operating environments 128 are located in remote areas, such as in a dessert or in space, store-and-forward networking allows for nodes to hold information until a communication can be established in the next node. In one or more embodiments, update data 118 and/or duplicate data 164 may be transmitted using epidemic routing. In one or more embodiments, epidemic routing includes a process in which nodes replicate data bundles 152 and transmit the replicated data bundles 152 to newly discovered nodes that have not already received the data bundles 152. In one or more embodiments, nodes may keep track of received messages in order to prevent redundancy. In one or more embodiments, epidemic routing may allow for data bundles 152 to be transmitted across a plurality of nodes to ensure that at least one data bundle 152 reaches it desired destination. In one or more embodiments, update data 118 may be transmitted using epidemic routing wherein plurality of data bundles 152 are replicated and transmitted to any available node until plurality of data bundles 152 are received by a receiver such as operating environment 128. In one or more embodiments, destination node may be configured to keep track of receipt of data bundles 152 in order to prevent redundant transmission of data bundles 152. In one or more embodiments, destination node may be configured to receive only one version of each data bundle 152 in order to prevent redundancy. In one or more embodiments, duplicate data 164 may be created during transmission wherein data bundles 152 may be replicated and transmitted to multiple nodes to ensure proper receipt of data bundles 152. In one or more embodiments, epidemic routing may utilize heavy resources or bandwidth yet allow for proper transmission of update data over a non-reliable network. In one or more embodiments, epidemic routing may allow for data bundles 152 to be continuously replicated and transmitted throughout a network until the data bundles 152 reach destination node. In one or more embodiments, a recipient, such as operating environment 128 may be configured to only receive one copy of each data bundle 152. In one or more embodiments, epidemic routing may allow for data bundles 152 to be transmitted across a particular participating node 160 only once in order to prevent redundancy of data bundles 152. In one or more embodiments, during epidemic routing, participating nodes 160 may be configured to cease transmission if the receiving node has already received the particular data bundle 160. In one or more embodiments, epidemic routing may ensure that data bundles are successfully transmitted across a network. In one or more embodiments, epidemic routing may ensure that a receiver only receives one dopy of each data bundle 152 due to prevention of transmission similar data bundles across the same node. For example, and without limitation, nodes across a network may be configured to only transmit one copy of each data bundle wherein the last node within the network may only be configured to receive one copy of each data bundle 152.

With continued reference to FIG. 1, transmission of update data 118 may include the use of prophet routing. In one or more embodiments, prophet routing (Probabilistic Routing Protocol using History of Encounters and Transitivity) may include a process of predicting probabilities of a node coming into contact with another node and transmitting data bundles 152 to nodes with the highest probabilities. In one or more embodiments, a computing system may determine the probability that a node will make contact with a corresponding node and select the node having the highest probability for transmission. In one or more embodiments, in prophet routing, only one node is chosen for transmission. In one or more embodiments, nodes may be chosen using adaptive algorithms used to determine the delivery probabilities of each node. In one or more embodiments, nodes may be selected as a function of a machine learning model such as node machine learning model 168. In one or more embodiments, transmission of update data may include a spray and wait process wherein nodes may initially spray multiple copies of a data bundle 152 and wait until one of the participating nodes 160 transfer the data bundle 152. In one or more embodiments, in a spray and wait process, the amount of nodes in which data bundles 152 are replaced and transmitted to are limited unlike an epidemic routing process. In one or more embodiments, in a spray and waiting process, a predefined number of nodes may be selected for replication of data bundle 152 wherein the network may wait a predetermined time for one of the selected nodes to transfer the data bundle 152 prior to replicating more data bundles 152. In instances in which a participating node 160 is found, then the network may stop 'spraying' nodes.

With continued reference to FIG. 1, processor 108 may transmit update data 118 and duplicate data 164 using parallel transmission. For the purposes of this disclosure "parallel transmission" refers to a process in which similar data is transmitted simultaneously over differing channels to the same destination. For example and without limitation, update data may be transmitted over a cellular network to operating environment whereas duplicate data 164 may be transmitted over a satellite network. In one or more embodiments, update data 118 and one or more duplicate data 164 may be transmitted simultaneously over multiple differing network channels to operating environment 128. In one or more embodiments, operating environment 128 and/or a network may compare update data to duplicate data 164 to determine if any data bundles 152 were lost or corrupt during transmission. In one or more embodiments, operating environment 128 and/or a network device such as a router, switch, gateway and the like may be configured to receive update data and duplicate data 164 and compare both data files to ensure that data bundles 152 were not lost during transmission. In one or more embodiments, multiple copies of update data may be transmitted over multiple differing network channels wherein data may be compared to ensure proper transmission. In instances in which two replicated data files are not similar, then operating environment may not utilize update data as the data file may be corrupt or unfit for use. In one or more embodiments, error correction and correction mechanisms may be used to identify and resolve transmission errors or modifications. In one or more embodiments, multiple channels employ different modulation schemes, frequencies, or transmission paths to ensure that if one channels experience interference or degradation, others can still transmit.

With continued reference to FIG. 1, operating environment and/or a network device may be configured to generate transmission feedback 176. "Transmission feedback" for the purposes of this disclosures is information associated with the transmission of update data. For example, and without limitation, transmission feedback 176 may include a transmission time wherein the transmission time includes a time of how long it took update data to reach its destination. In one or more embodiments, transmission feedback 176 may include the size of update data and/or any other associated metadata. In one or more embodiments transmission feedback 176 may include information associated with a comparison between update data and duplicate data 164. In an embodiment, transmission feedback 176 may indicate if both files were similar and/or errors within the files. In one or more embodiments, different error correction codes can be transmitted over different channels such as reed-Solomon codes or convolutional codes which provide redundancy and facilitate error correction in update data and/or duplicate data 164. In one or more embodiments, transmission feedback 176 may indicate the reliability of a network based on data bundles 152 received and transmission time. In one or more embodiments, transmission feedback 176 may be used to train node machine learning model 168 wherein node machine learning model 168 may be trained based on networks that were fast, slow and/or did not properly transmit messages. In one or more embodiments, node path 162 may indicate the type of network channel (e.g., cellular, satellite etc.) and the method of transmission (e.g., spray and waiting, epidemic routing, et.). In one or more embodiments, following transmission of update data, transmission feedback 176 may be used to train node machine learning model 168 wherein node machine learning model 168 may be trained based on the effectiveness of a node path 162. In one or more embodiments, a longer than expected transmission time may indicate that a node path 162 was not reliable. In an embodiment, an expect transmission time and/or a sooner than expect transmission time may indicate that a node path 162 was reliable. In one or more embodiments, transmission feedback 176 may contain the feedback of multiple data files wherein each data file is a duplicate of update data 118. In one or more embodiments, the data file and/or duplicate with the best transmission time may be used to train node machine learning model 168 for future iterations. In one or more embodiments, transmission feedback 176 may be used to iteratively train node machine learning model 168 wherein following each iteration of the processing transmission feedback 176 may be used. In one or more embodiments, node machine learning model 168 may be trained using previously generated node paths 162 and correlated transmission feedback 176 to adjust weights of the machine learning model. In one or more embodiments, node machine learning model 168 may include any machine learning model as described in this disclosure.

With continued reference to FIG. 1, in one or more embodiments, transmission feedback 176 may include information indicating proper receipt of update data. In one or more embodiments, transmission feedback 176 may indicate proper installation of update data 118. In one or more embodiments, operating environment and/or a network device may generate transmission feedback 176 and transmit transmission feedback 176 to processor. In one or more embodiments, operating environment, may receive update data 118 and install update data 118 within operating environment 128. In one or more embodiments, upon successful completion of update data 118, operating environment 128 may generate transmission feedback 176 indicating successful installation of update data 118. In one or more embodiments, transmission feedback 176 may further indicate failure of receipt of update data and/or failure of installation, wherein processor 108 may be configured to transmit update data 118 again.

With continued reference to FIG. 1, processor 108 is configured to record transmission of update data 118 and/or duplicate data 164 to central log 148. In one or more embodiments, processor may record transmission by receiving transmission feedback 176 as updating central log 148 as a function of transmission feedback 176. In one or more embodiments, central log 148 may be used to trace updates within operating environment and record the movement or changes of software through the software development cycle. In one or more embodiments, changes may be tracked using version control wherein each version indicated within update data may be stored on central log 148 for others to view. In one or more embodiments, both update log 144 and central log 148 may be simultaneously updated. In one or more embodiments, in future iterations, processor 108 may be configured to compare update log 144 to central log 148 to ensure that only update data 118 received from processor 108 is used. In one or more embodiments, recording of transmission feedback 176 and/or transmission of update data 118 may allow for traceability wherein errors may be traced back to a particular transmission feedback 176 or update. In one or more embodiments, sources of transmission may be recorded within central log 148 and update log 144. In one or more embodiments, following each iteration of the processing and/or prior to each iteration of the processing, processor 108 may be configured to compare central log 148 to update log 144 to ensure that changes made to operating environment 128 are consistent and/or that operating environment 128 has not been tampered. In one or more embodiments, central log 148 and/or update log 144 may be stored on an immutable sequential listing, such as any immutable sequential listing as described in this disclosure to ensure that logs of updates and/or modifications to operating environment 128 cannot be removed. In one or more embodiments, central log 148 and/or transmission feedback 176 may be used to train node machine learning model 168 and/or to indicate to processor if update data, was properly received, installed and/or the like. In one or more embodiments, feedback mechanism may be used to signal to processor to transmit a second update data due to errors in transmission of first update data. In one or more embodiments, feedback transmission may be digitally signed to ensure that feedback transmission was properly transmitted from operating environment 128. In one or more embodiments, processor 108 may be configured to identify the digital signature on operating environment 128 to ensure that feedback transmission was properly transmitted from operating environment. In one or more embodiments, central log 148 may contain a plurality of feedback transmissions received from previous iterations wherein each feedback transmission may contain an associated digital signature. In one or more embodiments, upon receipt of feedback transmission, processor 108 may be configured to compare a digital signature within feedback transmission to a plurality of digital signatures within central log 148. In one or more embodiments, changes within a digital signature received from transmission feedback 176 in comparison to digital signatures within central log 148 may indicate that update data 118 and/or operating environment 128 have been tampered with.

With continued reference to FIG. 1, processor 108 may be configured to append a digital signature to transmission feedback 176. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described in this disclosure. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, processor 108 may be configured to append digital signature to transmission feedback 176 wherein data signature may be attached or added to the end of a data file, such as to the end of transmission feedback 176. In one or more embodiments, processor may be configured to transmit digital signature along with transmission feedback 176. In one or more embodiments, transmission feedback 176 and digital signature may be transmitted as separate files and/or within separate transmissions. In one or more embodiments, processor 108 may take a hash (wherein a hash may include a string generated by characters within transmission feedback 176) of transmission feedback 176 and encrypt the hash with the sender/user's private key. In one or more embodiments, digital signature may be appended to transmission feedback 176 wherein a recipient may confirm the authenticity of transmission feedback 176 using the sender's public key. In one or more embodiments, a hash function may be applied to upload data, wherein the hash function may be configured to create a string of fixed size using information from within transmission feedback 176. In one or more embodiments, the hash may be encrypted using a private key belonging to the sender, such as the user. In one or more embodiments, the hash may be appended to upload data. In one or more embodiments, the recipient of transmission feedback 176 such as an individual and/or computing device 104, may decrypt the hash using a public key and compare the decrypted hash to an independently generated hash. In one or more embodiments, comparison of two hashes may authenticate the origin of transmission feedback 176.

With continued reference to FIG. 1, in one or more embodiments, appending digital signature to transmission feedback 176 may include encrypting transmission feedback 176. In one or more embodiments, processor 108 may be configured to encrypt transmission feedback 176 using one or more cryptographic processes as described above. In one or more embodiments, processor 108 may utilize a cryptographic system as described above to convert plaintext within upload data to ciphertext. In one or more embodiments, a user may encrypt transmission feedback 176 wherein a software and/or operating environment 128 configured to receive upload data may contain the decryption key. In an embodiment, encryption may ensure that data is not tampered and/or viewed during transmission and that the proper operating environment 128 receives the proper upload data. In one or more embodiments, encrypting transmission feedback 176 may include the production of cryptographic hashes. In one or more embodiments, processor 108 may generate one or more cryptographic keys using one or more key generation processes as described in this disclosure. In one or more embodiments, digital signature and/or transmission feedback 176 may be encrypted using an encryption key.

With continued reference to FIG. 1, in one or more embodiments, processor 108 may be configured to append digital signature, associated with a transmission feedback 176 source, to transmission feedback 176. In one or more embodiments, digital signature may be associated with a source of transmission feedback 176, wherein a source of transmission feedback 176 may include the sender of transmission feedback 176, the creator and/or modified of transmission feedback 176 and the like. In one or more embodiments, digital signature may include information associated with the source of transmission feedback 176 in order to put a recipient on notice as to the source of the transmission. In one or more embodiments, digital signature may be unique to each source of a data transmission wherein digital associated with update data may include identifying information that may be used to identify the source of transmission feedback 176. In one or more embodiments, digital signature may be associated with the recipient of update data 118 wherein digital signature may include identifiers indicating the source of the transmission and the authenticity of the source.

With continued reference to FIG. 1, changes to operating environment may be logged within central log. In one or more embodiments, central log 148 may allow for user to track changes to operating environment 128. In one or more embodiments, central log 148 may include the data and/or time of transmission of update data, the data and/or time of receipt of update data, and/or the date and/or time of receipt of transmission feedback 176.

Figure 2:
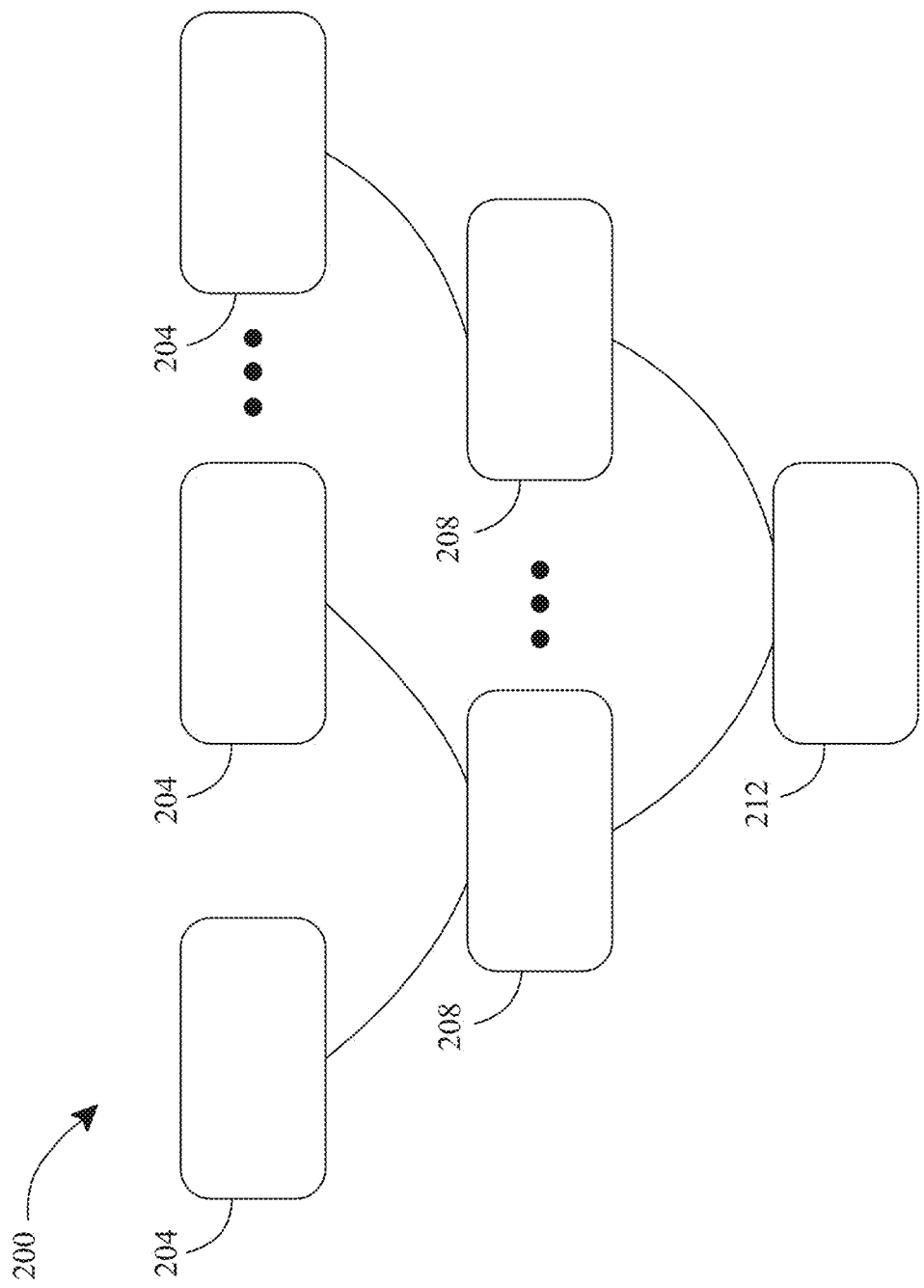
FIG. 2 illustrates an exemplary embodiment of a cryptographic accumulator.

Referring now to FIG. 2, an exemplary embodiment of a cryptographic accumulator 200 is illustrated. A "cryptographic accumulator," as used in this disclosure, is a data structure created by relating a commitment, which may be a smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 200 has a plurality of accumulated elements 204, each accumulated element 204 generated from a lot of the plurality of data lots. Accumulated elements 204 are create using an encryption process, defined for this purpose as a process that renders the lots of data unintelligible from the accumulated elements 204; this may be a one-way process such as a cryptographic hashing process and/or a reversible process such as encryption. Cryptographic accumulator 200 further includes structures and/or processes for conversion of accumulated elements 204 to root 212 element. For instance, and as illustrated for exemplary purposes in FIG. 2, cryptographic accumulator 200 may be implemented as a Merkle tree and/or hash tree, in which each accumulated element 204 created by cryptographically hashing a lot of data. Two or more accumulated elements 204 may be hashed together in a further cryptographic hashing process to produce a node 208 element; a plurality of node 208 elements may be hashed together to form parent nodes 208, and ultimately a set of nodes 208 may be combined and cryptographically hashed to form root 212. Contents of root 212 may thus be determined by contents of nodes 208 used to generate root 212, and consequently by contents of accumulated elements 204, which are determined by contents of lots used to generate accumulated elements 204. As a result of collision resistance and avalanche effects of hashing algorithms, any change in any lot, accumulated element 204, and/or node 208 is virtually certain to cause a change in root 212; thus, it may be computationally infeasible to modify any element of Merkle and/or hash tree without the modification being detectable as generating a different root 212. In an embodiment, any accumulated element 204 and/or all intervening nodes 208 between accumulated element 204 and root 212 may be made available without revealing anything about a lot of data used to generate accumulated element 204; lot of data may be kept secret and/or demonstrated with a secure proof as described below, preventing any unauthorized party from acquiring data in lot.

Alternatively or additionally, and still referring to FIG. 2, cryptographic accumulator 200 may include a "vector commitment" which may act as an accumulator in which an order of elements in set is preserved in its root 212 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 200 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 3:
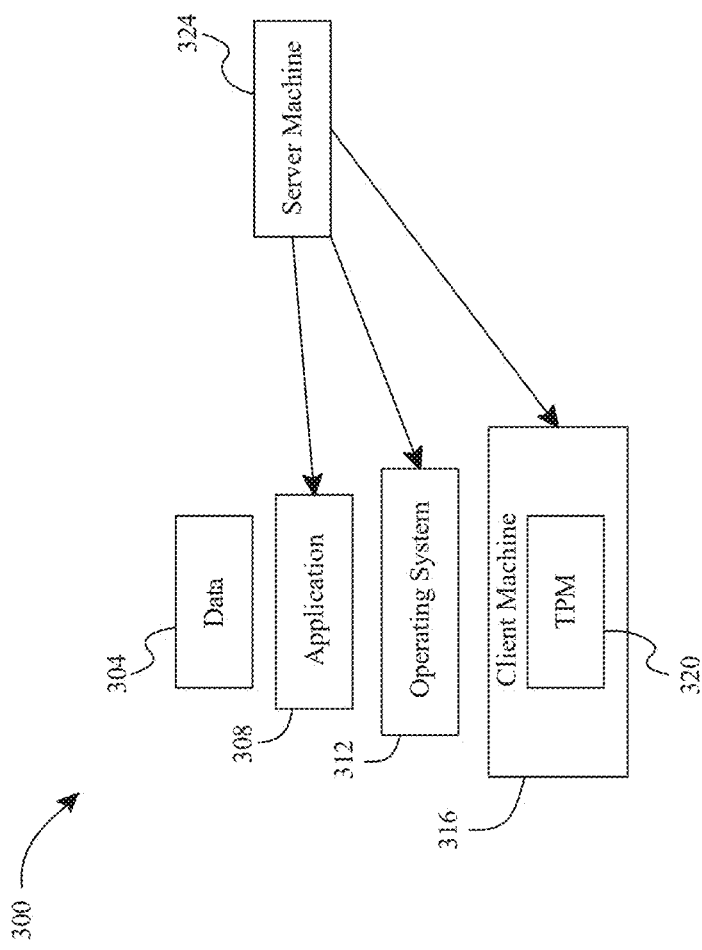
FIG. 3 is an exemplary embodiment of a system for a trusted computing architecture.

Referring now to FIG. 3, an exemplary embodiment of a system 300 for a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, trusted computing may which system 312 and application 308 perform one or more actions, determinations, calculations, or the like as described in this disclosure. Trusted computing may also enable integrated data privacy involving NFTs in the launching of the NFTs onto a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data 304, and other system state information, and remote attestation configured to allow a trusted device to present reliable evidence to remote parties about the software it is running.

In a non-limiting embodiment, and still referring to FIG. 3, trusted computing may include a secure coprocessor and/or crypto processor such as without limitation a Trusted Platform Module (TPM) 320. A "Trusted Platform Module," as used in this disclosure, is a tamper resistant piece of cryptographic hardware built onto a system board or other hardware that implements primitive cryptographic functions on which more complex features can be built. A client machine 316 may be integrated with TPM 320 architecture which a server machine 324 may verify. In a non-limiting embodiment, client machine 316 may be consistent with a computing device as described in the entirety of this disclosure. In another non-limiting embodiment, client machine 316 may be consistent with system 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data 304, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 324 such as a certification authority (CA).

In a non-limiting embodiment and still referring to FIG. 3, a TPM may perform an integrity measurement to enable a user and/or process access to private data 304. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example and without limitation, at load-time, TPM may use a hash function to fingerprint an executable, an executable plus its input data 304, or a sequence of such files. These hash values may be used in attestation to reliably establish code identity to remote or local verifiers such as server machine 324. Hash values can also be used in conjunction with a sealed storage feature. A secret may be sealed along with a list of hash values of programs that are allowed to unseal the secret. This may allow creation of data files that can only be opened by specific applications.

With continued reference to FIG. 3, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data 304 is accurate because it is signed by TPM 320 whose key may be certified by a CA. Attestation may include a remote attestation. A "remote attestation," as used in this disclosure, is method by which a host (client) authenticates it's hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 320 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In one or more embodiments, central log may be stored on an immutable sequential listing to prevent tampering of central log. In one or more embodiments, central log may be stored on any immutable sequential listing as described in further detail below.

Figure 4:
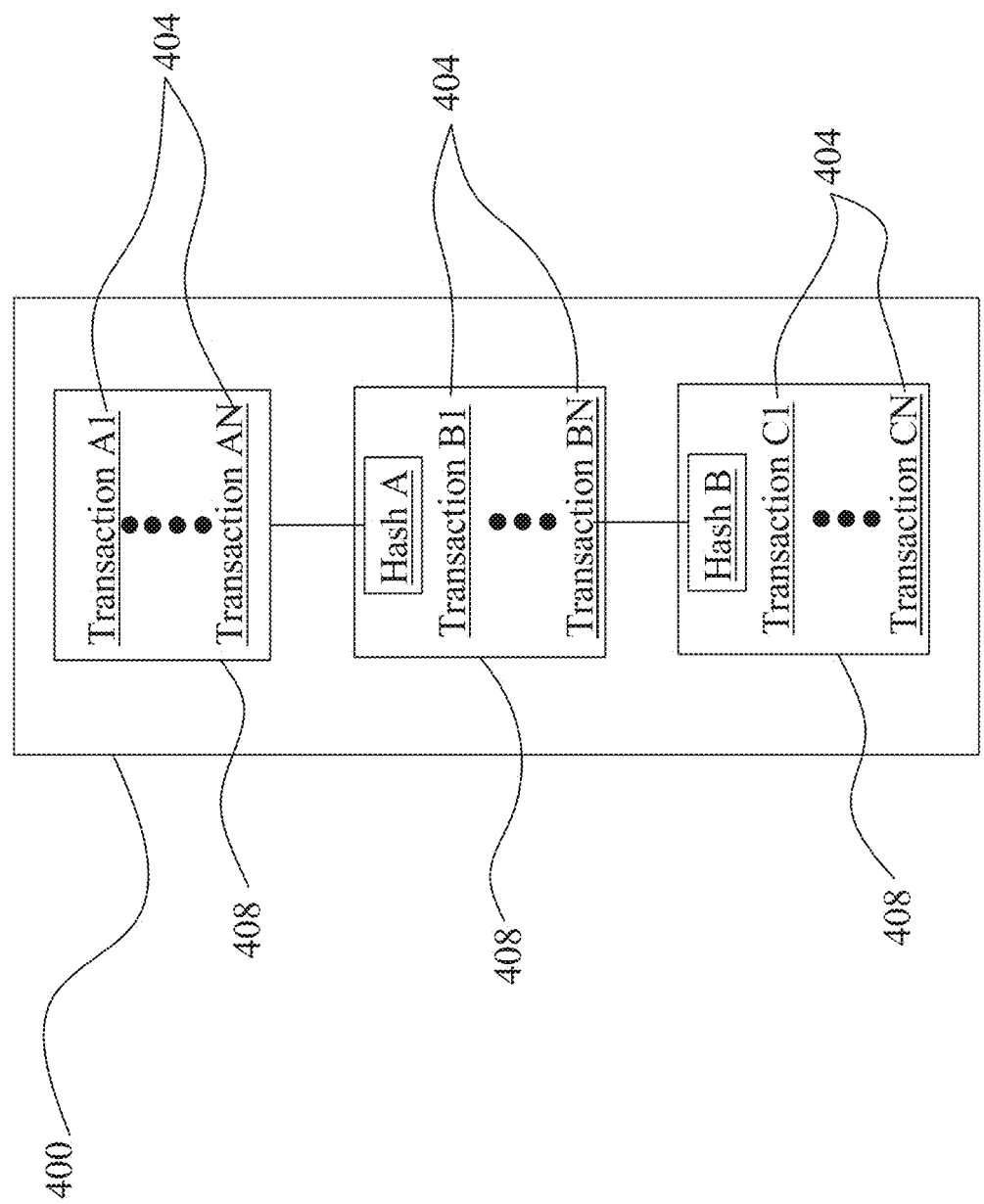
FIG. 4 is an exemplary embodiment of an immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like. Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block".

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Figure 5:
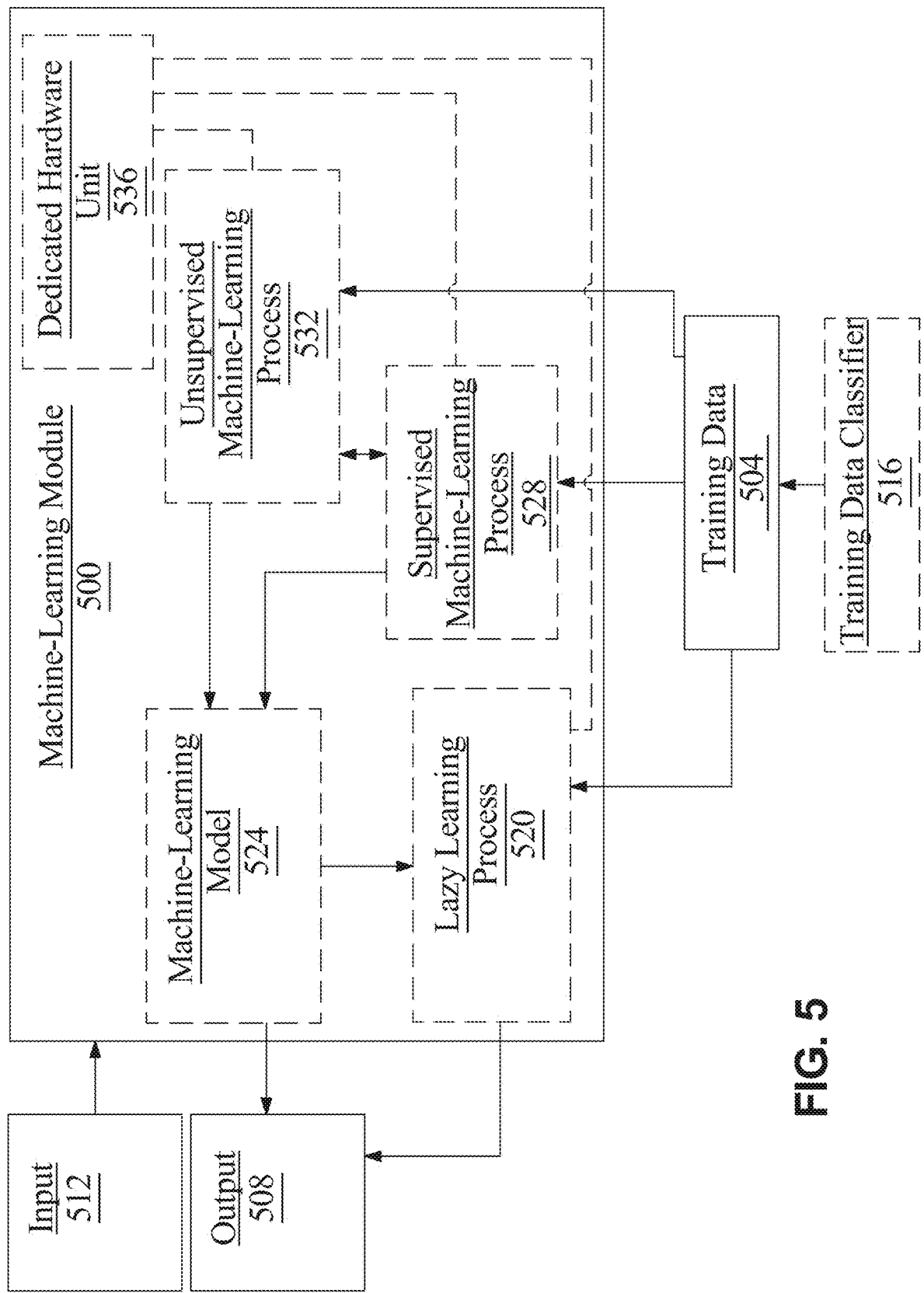
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include inputs such as source nodes, destination nodes, update data and/or any other inputs as described above and outputs may include node paths 162.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to particular network channels wherein each training data set may be classified to a particular network. For example, and without limitation, a first training data set may be classified to cellular networks whereas a second training data set may be classified to satellite networks.

Still referring to FIG. 5, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as source nodes, destination nodes, operating environments, a location of system 100 and the like as described above as described above as inputs, node paths 162 as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
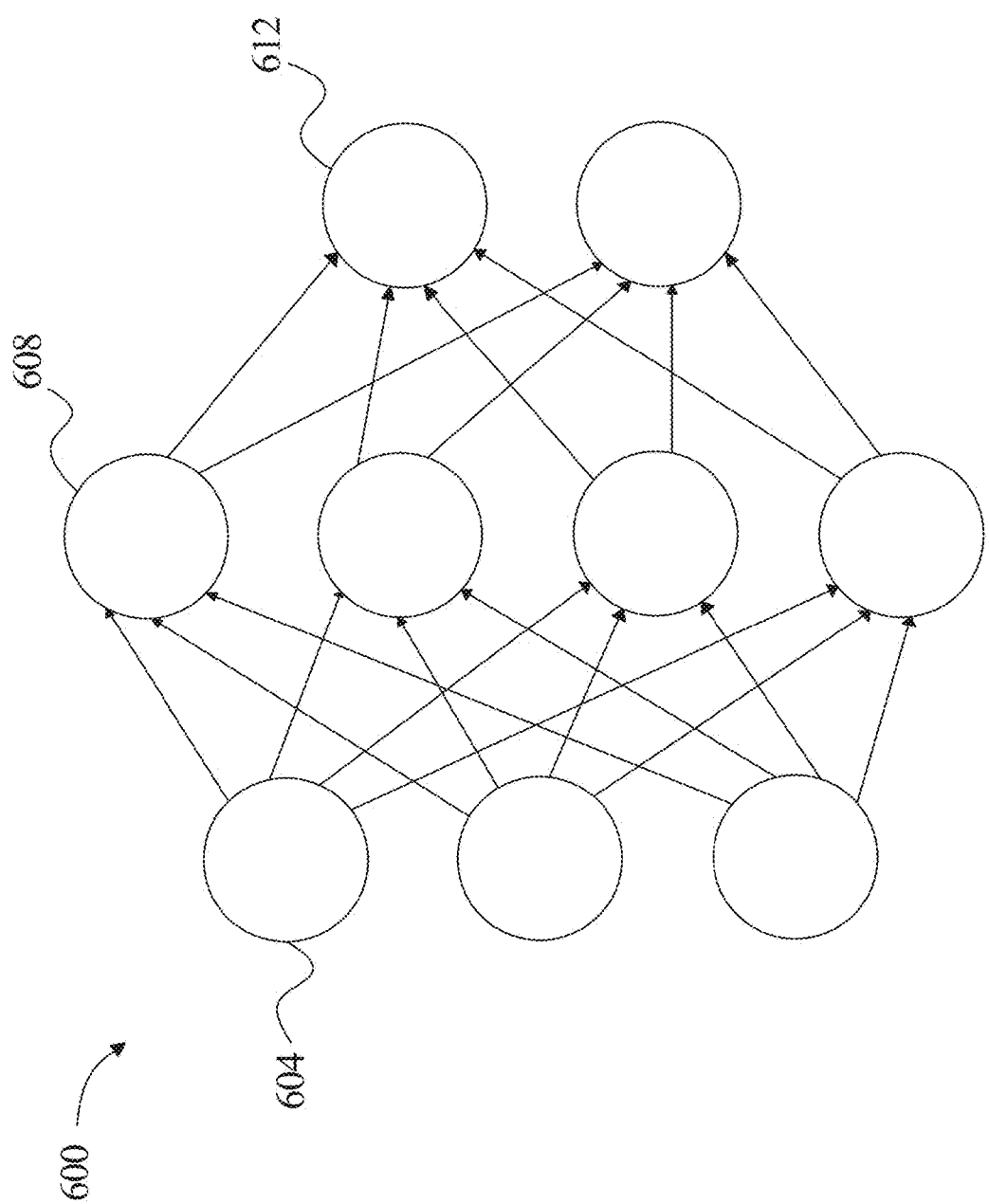
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
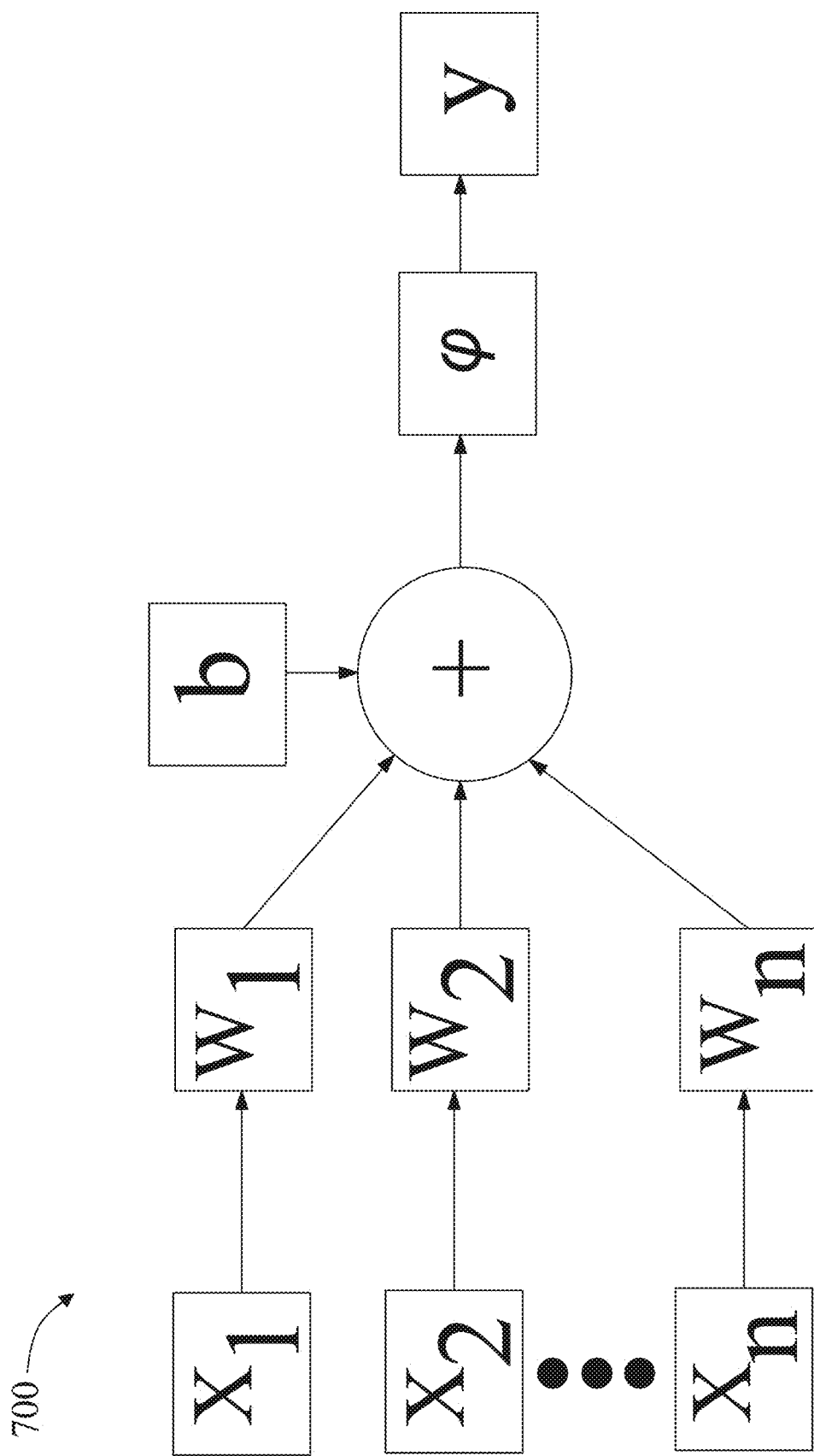
FIG. 7 is a diagram of an exemplary embodiment of a node of a neural network.

Referring now to FIG. 7, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
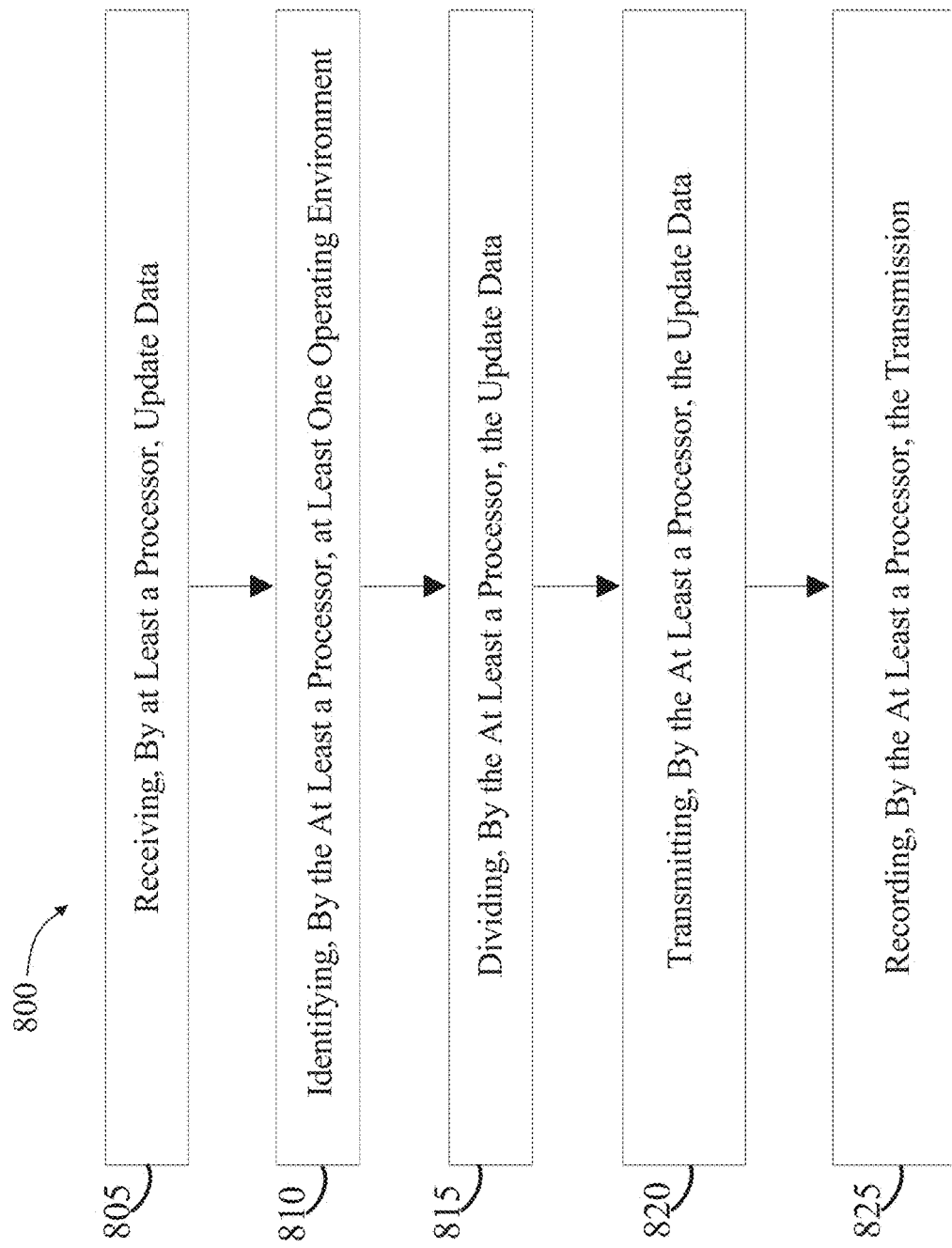
FIG. 8 is a flow diagram illustrating an exemplary embodiment of a method for transmission of software to remote environments.

Referring now to FIG. 8, a method 800 for transmission of software to remote environments is described. At step 805, method 800 includes receiving, by at least a processor, update data for use in one or more operating environments. This may be implemented with reference to FIGS. 1-7 and without limitation.

With continued reference to FIG. 8, at step 810, method 800 includes identifying, by the at least a processor, at least one operating environment for receipt of the update data. In one or more embodiments, identifying, by the at least a processor, at least one operating environment for receipt of the update data includes identifying one or more operating environments as a function of DAL classification. This may be implemented with reference to FIGS. 1-7 and without limitation.

With continued reference to FIG. 8, at step 815 method 800 includes dividing, by the at least a processor, the update data into a plurality of data bundles. In one or more embodiments, dividing, by the at least a processor, the update data into a plurality of data bundles includes generating at least one duplicate of the update data and dividing the update data and the at least one duplicate into the plurality of data bundles, wherein each data bundle of the plurality of data bundles includes at least one corresponding copy. This may be implemented with reference to FIGS. 1-7 and without limitation.

With continued reference to FIG. 8, at step 820 method 800 includes transmitting, by the at least a processor, the plurality of data bundles to the at least one operating environment, wherein transmitting the plurality of data bundles includes identifying a plurality of participating nodes for transmission of the plurality of data bundles and transmitting each data bundle of the plurality of data bundles with each participating node of the plurality of participating nodes. In one or more embodiments, transmitting the plurality of data bundles to the at least one operating environment includes transmitting the plurality of data bundles through multiple differing network channels. IN one or more embodiments, transmitting the plurality of data bundles to the at least one operating environment further includes receiving transmission feedback from the at least one operating environment. In one or more embodiments, transmitting the plurality of data bundles to the at least one operating environment includes transmitting the plurality of data bundles to the at least one operating environment using delay tolerant networking. In one or more embodiments, identifying the plurality of participating nodes for transmission of the plurality of data bundles includes identifying the plurality of participating nodes as a function of a machine learning model. In one or more embodiments, identifying the plurality of participating nodes for transmission of the plurality of data bundles includes receiving node training data having a plurality of source nodes and destination nodes correlated to a plurality of node paths, training a node machine learning model as a function of the node training data and determining a node path for the plurality of data bundles as a function of the node machine learning model. In one or more embodiments, training the node machine learning model includes receiving transmission feedback from the at least one operating environment following each iteration of the processing and iteratively training the node machine learning model as a function of the transmission feedback. In one or more embodiments, transmitting, by the at least a processor, the plurality of data bundles to the at least one operating environment includes interleaving the plurality of data bundles through multiple network channels. In one or more embodiment, transmitting, by the at least a processor, may include transmitting using epidemic routing. This may be implemented with reference to FIGS. 1-7 and without limitation.

With continued reference to FIG. 8, at step 825, method 800 includes recording, by the at least a processor, the transmission on a central log. This may be implemented with reference to FIGS. 1-7 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
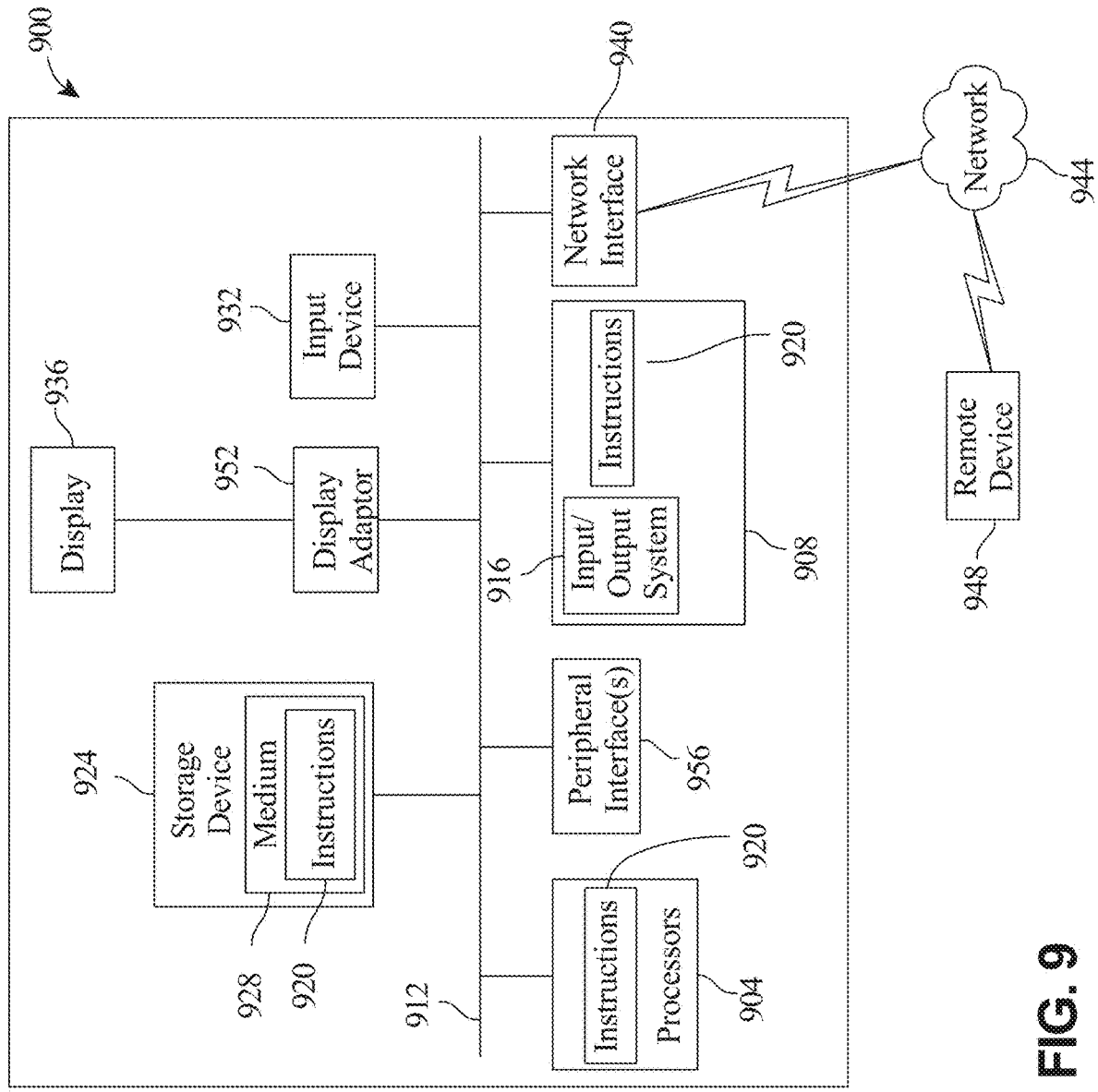
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for transmission of software to remote environments, the system comprising:
at least a processor; and
a memory communicatively connected to the at least a processor, the memory containing instructions configuring the at least a processor to:
receive update data comprising a system modification for use in one or more operating environments;
identify at least one operating environment for receipt of the update data;
divide the update data into a plurality of data bundles which comprises dividing the update data and at least one duplicate into the plurality of data bundles, wherein each data bundle of the plurality of data bundles comprises at least one corresponding copy utilizing a node machine learning model which comprises:
receiving node training data comprising a plurality of source nodes and destination nodes correlated to a plurality of node paths;
training, iteratively, the node machine learning model using the node training data, wherein training the node machine learning model includes retraining the node machine learning model with feedback from previous iterations of the node machine learning model; and
determining a node path for the plurality of data bundles as a function of the trained node machine learning model;
transmit the plurality of data bundles to the at least one operating environment, wherein transmitting the plurality of data bundles comprises:
identifying a plurality of participating nodes for transmission of the plurality of data bundles; and
transmitting each data bundle of the plurality of data bundles with each participating node of the plurality of participating nodes, wherein transmitting further comprises:
transmitting a first bundle over a first communication channel; and
transmitting a second bundle over a second communication channel, wherein the second communication channel uses a different communication technology from the first communication channel; and
record the transmission on a central log.

2. The system of claim 1, wherein dividing the update data into a plurality of data bundles comprises:
generating at least one duplicate of the update data.

3. The system of claim 2, wherein transmitting the plurality of data bundles to the at least one operating environment comprises transmitting the plurality of data bundles through multiple differing network channels.

4. The system of claim 1, wherein transmitting the plurality of data bundles to the at least one operating environment further comprises receiving transmission feedback from the at least one operating environment.

5. The system of claim 1, wherein transmitting the plurality of data bundles to the at least one operating environment comprises transmitting the plurality of data bundles to the at least one operating environment using delay tolerant networking.

6. The system of claim 1, wherein the first network communication channel is a satellite communication channel and the second network communication channel is an ad hoc network communication channel.

7. The system of claim 1, wherein identifying at least one operating environment for receipt of the update data comprises identifying one or more operating environments as a function of a DAL classification.

8. A method for transmission of software to remote environments, the method comprising:
   receiving, by at least a processor, update data for use in one or more operating environments comprising a system modification;
   identifying, by the at least a processor, at least one operating environment for receipt of the update data;
   dividing, by the at least a processor, the update data into a plurality of data bundles which comprises dividing the update data and at least one duplicate into the plurality of data bundles, wherein each data bundle of the plurality of data bundles comprises at least one corresponding copy utilizing a node machine learning model which comprises:
      receiving node training data comprising a plurality of source nodes and destination nodes correlated to a plurality of node paths;
      training, iteratively, the node machine learning model using the node training data, wherein training the node machine learning model includes retraining the node machine learning model with feedback from previous iterations of the node machine learning model; and
      determining a node path for the plurality of data bundles as a function of the trained node machine learning model;
   transmitting, by the at least a processor, the plurality of data bundles to the at least one operating environment, wherein transmitting the plurality of data bundles comprises:
      identifying a plurality of participating nodes for transmission of the plurality of data bundles; and
      transmitting each data bundle of the plurality of data bundles with each participating node of the plurality of participating nodes, wherein transmitting further comprises:
         transmitting a first bundle over a first communication channel; and
         transmitting a second bundle over a second communication channel, wherein the second communication channel uses a different communication technology from the first communication channel; and
   recording, by the at least a processor, the transmission on a central log.

9. The method of claim 8, wherein dividing, by the at least a processor, the update data into a plurality of data bundles comprises:
   generating at least one duplicate of the update data.

10. The method of claim 9, wherein transmitting the plurality of data bundles to the at least one operating environment comprises transmitting the plurality of data bundles through multiple differing network channels.

11. The method of claim 8, wherein transmitting the plurality of data bundles to the at least one operating environment further comprises receiving transmission feedback from the at least one operating environment.

12. The method of claim 8, wherein transmitting the plurality of data bundles to the at least one operating environment comprises transmitting the plurality of data bundles to the at least one operating environment using delay tolerant networking.

13. The method of claim 8, wherein the first network communication channel is a satellite communication channel and the second network communication channel is an ad hoc network communication channel.

14. The method of claim 8, wherein identifying, by the at least a processor, at least one operating environment for receipt of the update data comprises identifying one or more operating environments as a function of a DAL classification.

* * * * *